US010662279B2

United States Patent
Yoshida et al.

(10) Patent No.: US 10,662,279 B2
(45) Date of Patent: May 26, 2020

(54) EPOXY RESIN COMPOSITION, SEMI-CURED EPOXY RESIN COMPOSITION, CURED EPOXY RESIN COMPOSITION, MOLDED ARTICLE, AND CURED MOLDED ARTICLE

(71) Applicant: HITACHI CHEMICAL COMPANY, LTD., Tokyo (JP)

(72) Inventors: Yuka Yoshida, Tokyo (JP); Kenji Tanaka, Tokyo (JP); Hideyuki Katagi, Tokyo (JP); Yoshihiro Amano, Tokyo (JP); Shinichi Kosugi, Tokyo (JP); Haruaki Sue, Tokyo (JP); Yoshitaka Takezawa, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 16/079,840

(22) PCT Filed: Aug. 25, 2016

(86) PCT No.: PCT/JP2016/074879
§ 371 (c)(1),
(2) Date: Aug. 24, 2018

(87) PCT Pub. No.: WO2017/145410
PCT Pub. Date: Aug. 31, 2017

(65) Prior Publication Data
US 2019/0040183 A1 Feb. 7, 2019

(30) Foreign Application Priority Data

Feb. 25, 2016 (JP) ................. 2016-034886

(51) Int. Cl.
*C08G 59/24* (2006.01)
*C08K 3/22* (2006.01)
(Continued)

(52) U.S. Cl.
CPC .......... *C08G 59/245* (2013.01); *C08G 59/24* (2013.01); *C08G 59/621* (2013.01); *C08K 3/22* (2013.01); *C08K 3/28* (2013.01); *C08K 3/36* (2013.01); *C08K 3/38* (2013.01); *C08K 5/5403* (2013.01); *C08L 61/12* (2013.01); *C08L 63/00* (2013.01); *C08L 63/04* (2013.01); *C08K 5/544* (2013.01);
(Continued)

(58) Field of Classification Search
CPC .... C08G 59/245; C08G 59/24; C08G 59/621; C08K 3/22; C08K 3/28; C08K 3/36; C08K 3/38; C08K 5/54; C08K 5/5403; C08K 5/544; C08K 2003/222; C08K 2003/2227; C08K 2003/282; C08K 2003/385; C08L 61/12; C08L 63/00; C08L 63/04
USPC ....................................................... 523/414
See application file for complete search history.

(56) References Cited

U.S. PATENT DOCUMENTS

2003/0232964 A1    12/2003    Akatsuka et al.
2004/0147709 A1     7/2004    Akatsuka et al.
2006/0276568 A1    12/2006    Akatsuka et al.

FOREIGN PATENT DOCUMENTS

CN        1465607 A    1/2004
CN      103906785 A    7/2014
(Continued)

OTHER PUBLICATIONS

The 64th Symposium on Macromolecules S22. "Recent Developments in Synthesis of Networked Polymers and Their Novel Properties and Functions", Sep. 17, 2015, Hitachi Chemical Co., Ltd. Kenji Tanaka, Yuka Yoshida, Shinichi Kosugi, Hideyuki Katagi, Haruaki Sue, Yoshitaka Takezawa.
(Continued)

*Primary Examiner* — David T Karst
(74) *Attorney, Agent, or Firm* — Fitch, Even, Tabin & Flannery, L.L.P.

(57) ABSTRACT

Provided is an epoxy resin composition including an epoxy resin and a curing agent, in which the epoxy resin contains a multimeric compound having at least one selected from the group consisting of a structural unit represented by the following Formula (IA) and a structural unit represented by the following Formula (IB), the multimeric compound contains a dimeric compound containing two structural units represented by the following Formula (II) in one molecule, and a ratio of the dimeric compound is from 15% by mass to 28% by mass with respect to the epoxy resin as a whole.

18 Claims, No Drawings

(51) Int. Cl.

| | | |
|---|---|---|
| *C08K 3/28* | (2006.01) | |
| *C08K 3/36* | (2006.01) | |
| *C08L 61/12* | (2006.01) | |
| *C08L 63/00* | (2006.01) | |
| *C08G 59/62* | (2006.01) | |
| *C08K 3/38* | (2006.01) | |
| *C08K 5/54* | (2006.01) | |
| *C08L 63/04* | (2006.01) | |
| *C08K 5/544* | (2006.01) | |
| *C08K 5/101* | (2006.01) | |
| *C08K 5/5415* | (2006.01) | |

(52) U.S. Cl.
CPC .................. *C08K 2003/222* (2013.01); *C08K 2003/2227* (2013.01); *C08K 2003/282* (2013.01); *C08K 2003/385* (2013.01)

(56) References Cited

FOREIGN PATENT DOCUMENTS

| JP | 2002-226550 A | 8/2002 |
|---|---|---|
| JP | 2004-010762 A | 1/2004 |
| JP | 2004-161909 A | 6/2004 |
| JP | 4118691 B2 | 7/2008 |
| JP | 4619770 B2 | 1/2011 |
| JP | 2011-084557 A | 4/2011 |
| JP | 2012-067205 A | 4/2012 |
| JP | 2013-227451 A | 11/2013 |
| JP | 2013-234313 A | 11/2013 |
| JP | 5471975 B2 | 4/2014 |
| WO | 02/094905 A1 | 11/2002 |
| WO | 2013/065159 A1 | 5/2013 |

OTHER PUBLICATIONS

The 65th Symposium on Networked Polymer, "Behavior of High-Order Structure Formation of Reaction-Induced Smectic Type Mesogen Epoxy Resin", Hitachi Chemical Co., Ltd. Yuka Yoshida, Kenji Tanaka, Hideyuki Katagi, Yoshihiro Amano, Yoshitaka Takezawa, Hitachi, Ltd. Shingo Tanaka, Oct. 8, 2015.

"Transfer Molding Composite Using Reaction-Induced Smectic Type Mesogen Epoxy Resin" Hitachi Chemical Co., Ltd. Kenji Tanaka, Yuka Yoshida, Shinichi Kosugi, Hideyuki Katagi, Haruaki Sue, Yoshitaka Takezawa, published Aug. 25, 2015.

"Behavior of High-Order Structure Formation of Reaction-Induced Smectic Type Mesogen Epoxy Resin" Hitachi Chemical Co., Ltd. 1, and Hitachi, Ltd.2 Yuka Yoshida, Kenji Tanaka, Hideyuki Katagi, Yoshihiro Amano, Yoshitaka Takezawa, and Shingo Tanaka, published Oct. 7, 2015.

EPOXY RESIN COMPOSITION, SEMI-CURED EPOXY RESIN COMPOSITION, CURED EPOXY RESIN COMPOSITION, MOLDED ARTICLE, AND CURED MOLDED ARTICLE

CROSS-REFERENCE TO RELATED APPLICATIONS

This application is a U.S. national phase application filed under 35 U.S.C. § 371 of International Application No. PCT/JP2016/074879, filed Aug. 25, 2016, which claims priority from Japanese Patent Application No. 2016-034886, filed Feb. 25, 2016, designating the United States, which are hereby incorporated herein by reference in their entirety.

TECHNICAL FIELD

The present invention relates to an epoxy resin composition, a semi-cured epoxy resin composition, a cured epoxy resin composition, a molded article, and a cured molded article.

BACKGROUND ART

In recent years, industrial and automobile motors and industrial and automobile inverters have been rapidly downsized and increased in output, and insulating materials are demanded to have considerably superior properties. Particularly, the amount of heat generated from conductors densified in association with downsizing has been increased, making dissipation of the heat an important problem. As insulating materials used in these motors and inverters, cured articles containing a thermosetting resin are widely employed because of their high insulation performance, ease of molding, heat resistance and the like. However, since thermosetting resin cured articles generally have a low thermal conductivity and are thus a major factor that interferes with heat dissipation, it is desired to develop a resin cured article having a high thermal conductivity.

As resin cured articles having a high thermal conductivity, cured articles of epoxy resin compositions having a mesogen skeleton in the molecular structure have been proposed (see, for example, Patent Document 1). In Patent Document 1, it is disclosed that the thermal conductivity is improved by introducing a rigid structure, which is represented by a so-called mesogen skeleton, into the molecules of a resin and utilizing intermolecular stacking to allow expression of liquid crystallinity or crystallinity and to thereby suppress phonon scattering. As epoxy resins having a mesogen skeleton in the molecular structure, those compounds described in Patent Documents 2 to 4 and the like are exemplified.

For achieving an increase in the thermal conductivity of a resin cured article, there is a method of preparing a composite material by incorporating a thermal conductive filler composed of inorganic ceramic powder into a resin composition. As the thermal conductive filler, for example, alumina, magnesium oxide, beryllium oxide, boron nitride, aluminum nitride, silicon nitride, silicon carbide, aluminum fluoride, and calcium fluoride are known. This method is aimed at attaining both high thermal conductivity and electrical insulation in a composite material by incorporating a filler that exhibits both high thermal conductivity and electrical insulation into a resin composition.

RELATED ART DOCUMENTS

Patent Documents

[Patent Document 1] Japanese Patent No. 4118691
[Patent Document 2] Japanese Patent No. 4619770
[Patent Document 3] Japanese Patent No. 5471975
[Patent Document 4] Japanese Patent Application Laid-Open (JP-A) No. 2011-84557

SUMMARY OF INVENTION

Technical Problem

In a method of improving the thermal conductivity by increasing the amount of a filler to be added, since there is an upper limit on the amount of the filler for attaining electrical insulation at the same time, the improvement in the thermal conductivity of the resulting composite material is limited. Meanwhile, the use of a resin having a high thermal conductivity is desirable in that it can dramatically increase the thermal conductivity of a composite material. However, since mesogen skeleton-containing resins generally have a high melting point, such resins may cause a problem of reduction in the ease of handling.

As a countermeasure against decreased ease of handling, a method of increasing fluidity by blending a compatible resin with a mesogen skeleton-containing resin, and thereby reducing the resin crystallinity and lowering the melting point, is generally known. However, in such a blending method, high thermal conductivity is not exerted in some cases due to interference with the stacking of the resin after curing.

An object of the invention is to provide: an epoxy resin composition which has excellent fluidity and from which a molded article having a high thermal conductivity and a high glass transition temperature (hereinafter, may be referred to as "Tg") can be formed; and a semi-cured epoxy resin composition and a cured epoxy resin composition, in which the epoxy resin composition is used. Another object of the invention is to provide a molded article and a cured molded article, which have a high thermal conductivity and a high Tg.

Solution to Problem

The present inventors intensively studied to achieve the above-described objects, thereby completing the invention. That is, one embodiment of the invention includes the following modes.

<1> An Epoxy Resin Composition, Comprising:
an epoxy resin; and
a curing agent, wherein:
the epoxy resin comprises a multimeric compound having at least one selected from the group consisting of a structural unit represented by the following Formula (IA) and a structural unit represented by the following Formula (IB),
the multimeric compound comprises a dimeric compound containing two structural units represented by the following Formula (II) in one molecule, and
a ratio of the dimeric compound is from 15% by mass to 28% by mass with respect to the epoxy resin as a whole:

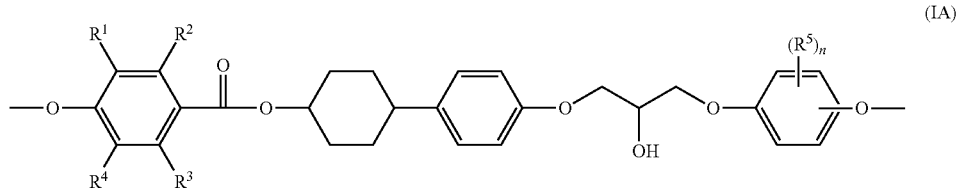

(IA)

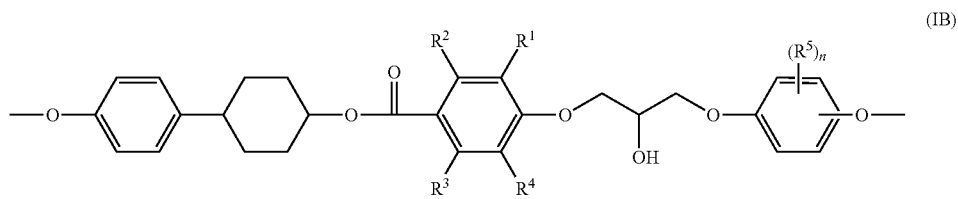

(IB)

wherein, in Formula (IA) and Formula (IB), each of $R^1$ to $R^4$ independently represents a hydrogen atom or an alkyl group having from 1 to 3 carbon atoms; each $R^5$ independently represents an alkyl group having from 1 to 8 carbon atoms; and n represents an integer from 0 to 4; and

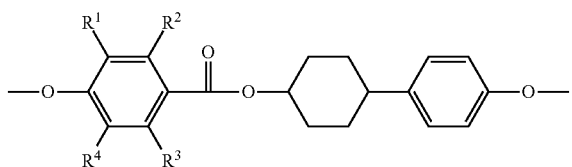

(II)

wherein, in Formula (II), each of $R^1$ to $R^4$ independently represents a hydrogen atom or an alkyl group having from 1 to 3 carbon atoms.

<2> The epoxy resin composition according to <1>, wherein:

the dimeric compound comprises at least one selected from the group consisting of a compound represented by the following Formula (II-A), a compound represented by the following Formula (II-B) and a compound represented by the following Formula (II-C), and a total ratio of the compound represented by the following Formula (II-A), the compound represented by the following Formula (II-B) and the compound represented by the following Formula (II-C) is from 15% by mass to 28% by mass with respect to the epoxy resin as a whole:

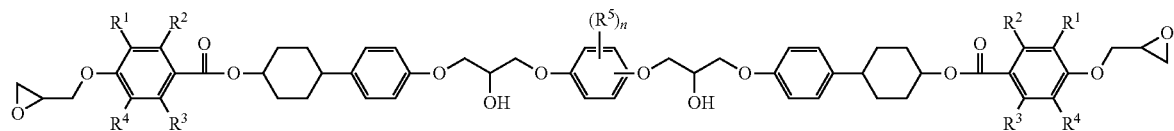

(II-A)

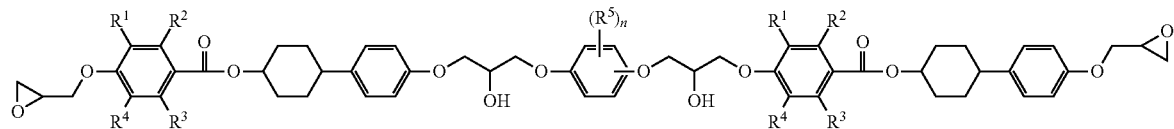

(II-B)

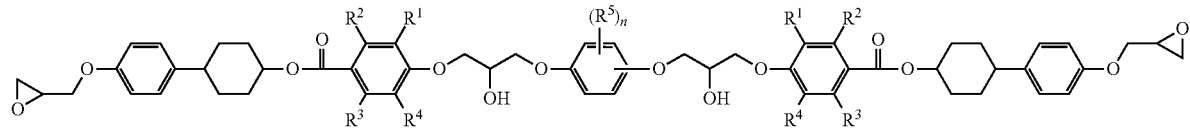

(II-C)

wherein, in Formula (II-A), to Formula (II-C), each of $R^1$ to $R^4$ independently represents a hydrogen atom or an alkyl group having from 1 to 3 carbon atoms; each $R^5$ independently represents an alkyl group having from 1 to 8 carbon atoms; and n represents an integer from 0 to 4.

<3> The epoxy resin composition according to <1>, wherein the structural unit represented by Formula (IA) is a structural unit represented by the following Formula (IA'), and the structural unit represented by Formula (IB) is a structural unit represented by the following Formula (IB'):

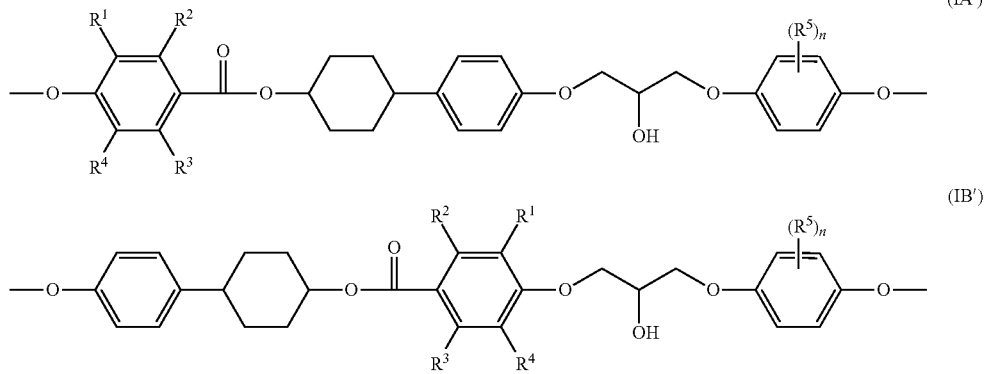

wherein, in Formula (IA') and Formula (IB'), each of $R^1$ to $R^4$ independently represents a hydrogen atom or an alkyl group having from 1 to 3 carbon atoms; each $R^5$ independently represents an alkyl group having from 1 to 8 carbon atoms; and n represents an integer from 0 to 4.

<4> The epoxy resin composition according to <3>, wherein:

the dimeric compound comprises at least one selected from the group consisting of a compound represented by the following Formula (II-A'), a compound represented by the following Formula (II-B') and a compound represented by the following Formula (II-C'), and a total ratio of the compound represented by the following Formula (II-A'), the compound represented by the following Formula (II-B') and the compound represented by the following Formula (II-C') is from 15% by mass to 28% by mass with respect to the epoxy resin as a whole:

wherein, in Formula (II-A') to Formula (II-C'), each of $R^1$ to $R^4$ independently represents a hydrogen atom or an alkyl group having from 1 to 3 carbon atoms; each $R^5$ independently represents an alkyl group having from 1 to 8 carbon atoms; and n represents an integer from 0 to 4.

<5> The epoxy resin composition according to any one of <1> to <4>, wherein:

the epoxy resin comprises an epoxy resin monomer represented by the following Formula (I''), and a ratio of the epoxy resin monomer is from 57% by mass to 80% by mass with respect to the epoxy resin as a whole:

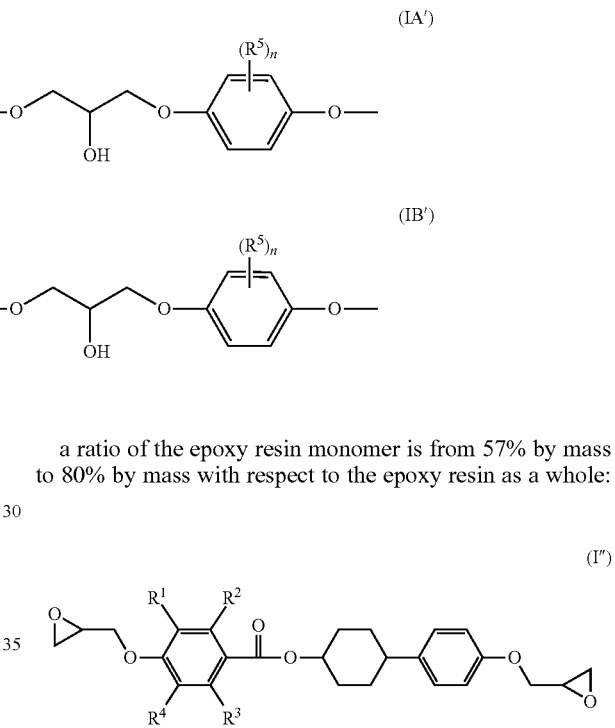

wherein, in Formula (I''), each of $R^1$ to $R^4$ independently represents a hydrogen atom or an alkyl group having from 1 to 3 carbon atoms.

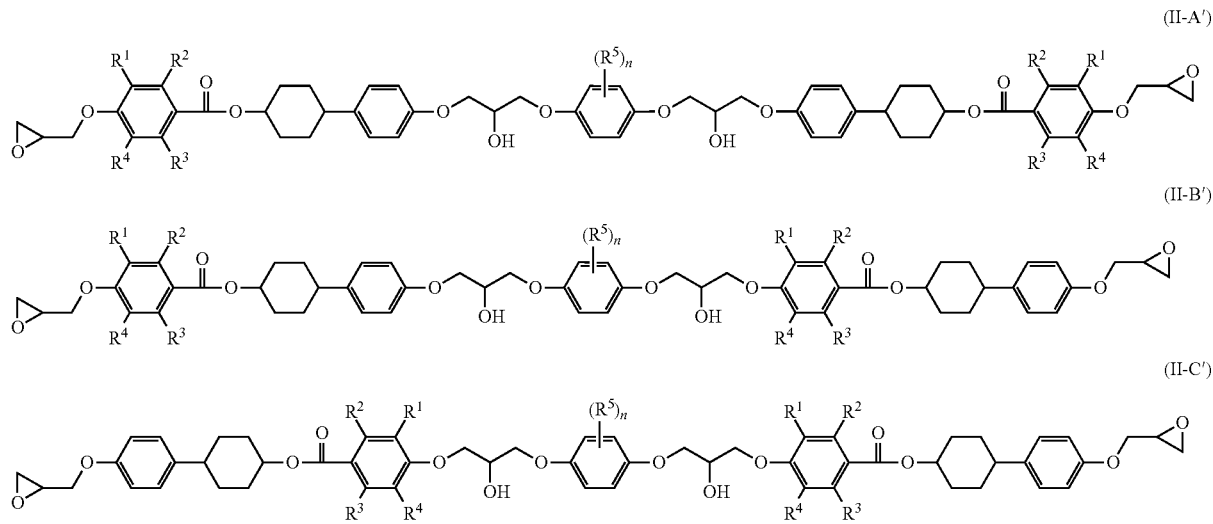

<6> The epoxy resin composition according to any one of <1> to <5>, wherein the curing agent comprises a novolac resin that contains a compound having a structural unit represented by at least one selected from the group consisting of the following Formula (II-1) and Formula (II-2):

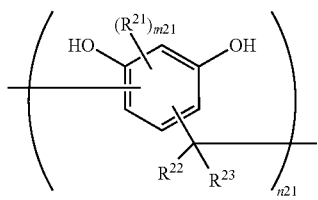
(II-1)

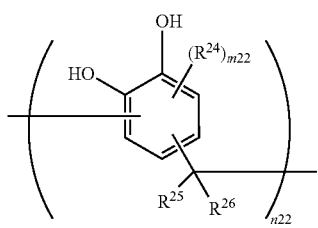
(II-2)

wherein, in Formula (II-1) and Formula (II-2), each of $R^{21}$ and $R^{24}$ independently represents an alkyl group, an aryl group, or an aralkyl group; each of $R^{22}$, $R^{23}$, $R^{25}$ and $R^{26}$ independently represents a hydrogen atom, an alkyl group, an aryl group, or an aralkyl group; each of m21 and m22 independently represents an integer from 0 to 2; and each of n21 and n22 independently represents an integer from 1 to 7.

<7> The epoxy resin composition according to any one of <1> to <5>, wherein the curing agent comprises a novolac resin that contains a compound having a structure represented by at least one selected from the group consisting of the following Formula (III-1) to Formula (III-4):

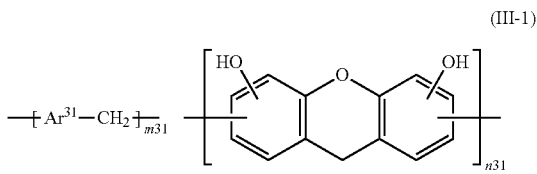
(III-1)

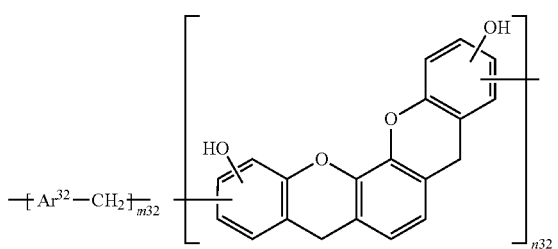
(III-2)

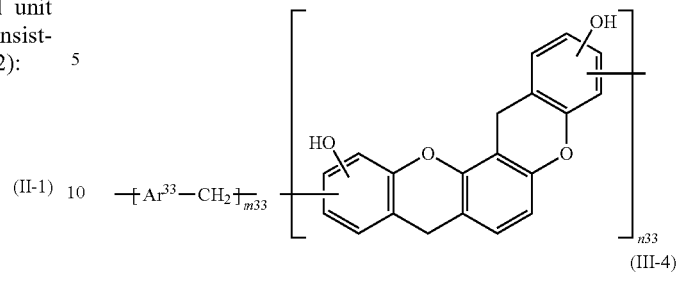
(III-3)

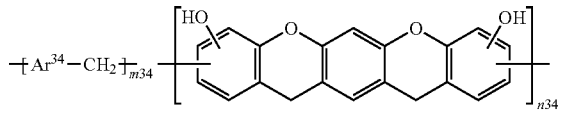
(III-4)

wherein, in Formula (III-1) to Formula (III-4), each of m31 to m34 and n31 to n34 independently represents a positive integer; and each of $Ar^{31}$ to $Ar^{34}$ independently represents a group represented by the following Formula (III-a) or a group represented by the following Formula (III-b):

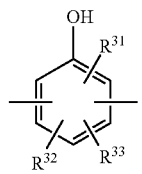
(III-a)

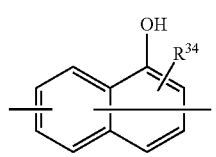
(III-b)

wherein, in Formula (III-a) and Formula (III-b), each of $R^{31}$ and $R^{34}$ independently represents a hydrogen atom or a hydroxyl group; and each of $R^{32}$ and $R^{33}$ independently represents a hydrogen atom or an alkyl group having from 1 to 8 carbon atoms.

<8> The epoxy resin composition according to <6> or <7>, wherein, in the curing agent, a content ratio of a monomer, which is the same as a phenol compound constituting the novolac resin, is from 10% by mass to 50% by mass.

<9> The epoxy resin composition according to any one of <1> to <8>, further comprising an inorganic filler.

<10> The epoxy resin composition according to <9>, wherein the inorganic filler comprises at least one selected from the group consisting of alumina, boron nitride, aluminum nitride, silica, and magnesium oxide.

<11> The epoxy resin composition according to <9> or <10>, wherein a content ratio of the inorganic filler is from 60% by volume to 90% by volume with respect to solid content.

<12> The epoxy resin composition according to any one of <1> to <11>, further comprising a silane coupling agent.

<13> The epoxy resin composition according to <12>, wherein the silane coupling agent comprises a phenyl group-containing silane coupling agent.

<14> A semi-cured epoxy resin composition, which is a semi-cured product of the epoxy resin composition according to any one of <1> to <13>.

<15> A cured epoxy resin composition, which is a cured product of the epoxy resin composition according to any one of <1> to <13>.

<16> A molded article produced by press-molding the epoxy resin composition according to any one of <1> to <13>.

<17> A cured molded article produced by post-curing the molded article according to <16> by heating.

Effects of Invention

According to the invention, an epoxy resin composition which has excellent fluidity and from which a molded article having a high thermal conductivity and a high Tg can be formed, as well as a semi-cured epoxy resin composition and a cured epoxy resin composition, in which the epoxy resin composition is used, can be provided. Further, according to the invention, a molded article and a cured molded article, which have a high thermal conductivity and a high Tg, can be provided.

DESCRIPTION OF EMBODIMENTS

Mode for Carrying Out the Invention

Embodiments of the invention are described below in detail. It is noted here, however, that the invention is not restricted to the below-described embodiments. In the below-described embodiments, the constituents thereof (including element steps and the like) are not indispensable unless otherwise specified. The same applies to the numerical values and ranges thereof, without restricting the invention.

In the present specification, the term "step" encompasses not only steps discrete from other steps but also steps which cannot be clearly distinguished from other steps, as long as the intended purpose of the step is achieved.

In the present specification, those numerical ranges that are expressed with "to" each denote a range that includes the numerical values stated before and after "to" as the minimum value and the maximum value, respectively.

In a set of numerical ranges that are stated stepwisely in the present specification, the upper limit value or the lower limit value of a numerical range may be replaced with the upper limit value or the lower limit value of other numerical range. Further, in a numerical range stated in the present specification, the upper limit or the lower limit of the numerical range may be replaced with a relevant value indicated in any of Examples.

In the present specification, when there are plural kinds of substances that correspond to a component of a composition, the indicated content ratio or amount of the component in the composition means, unless otherwise specified, the total content ratio or amount of the plural kinds of substances existing in the composition.

In the present specification, when there are plural kinds of particles that correspond to a component of a composition, the indicated particle size of the component in the composition means, unless otherwise specified, a value determined for a mixture of the plural kinds of particles existing in the composition.

<Epoxy Resin Composition>

The epoxy resin composition of the present disclosure includes: an epoxy resin; and a curing agent, wherein the epoxy resin contains a multimeric compound having at least one selected from the group consisting of a structural unit represented by the following Formula (IA) and a structural unit represented by the following Formula (IB), the multimeric compound contains a dimeric compound containing two structural units represented by the following Formula (II) in one molecule, and a ratio of the dimeric compound is from 15% by mass to 28% by mass with respect to the epoxy resin as a whole.

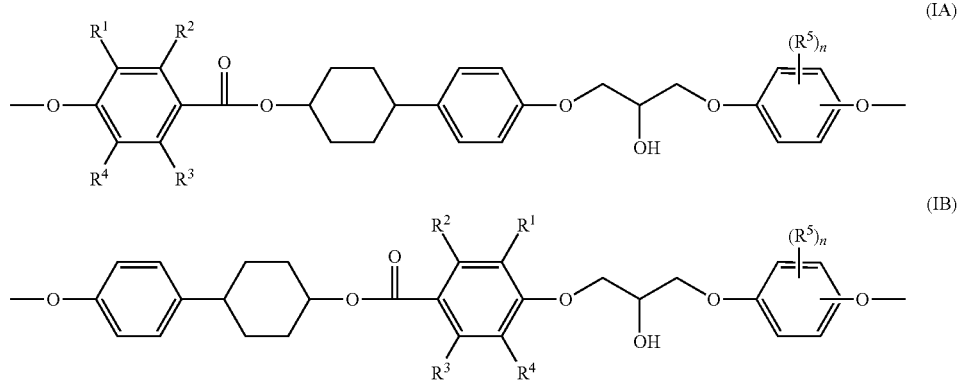

In Formula (IA) and Formula (IB), each of $R^1$ to $R^4$ independently represents a hydrogen atom or an alkyl group having from 1 to 3 carbon atoms; each $R^5$ independently represents an alkyl group having from 1 to 8 carbon atoms; and n represents an integer from 0 to 4.

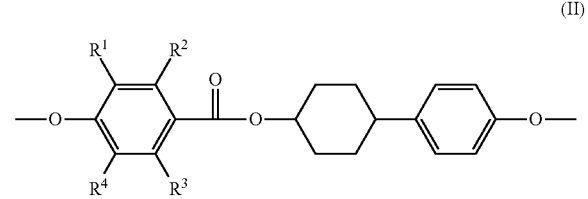

In Formula (II), each of $R^1$ to $R^4$ independently represents a hydrogen atom or an alkyl group having from 1 to 3 carbon atoms.

The epoxy resin composition of the disclosure has excellent fluidity. Further, a molded article and a cured molded article, in which the epoxy resin composition of the disclosure is used, can have a high thermal conductivity and a high Tg.

The components included in the epoxy resin composition of the disclosure are each described below in detail.

—Epoxy Resin—

The epoxy resin used in the disclosure contains a multimeric compound having at least one selected from the group consisting of a structural unit represented by Formula (IA) and a structural unit represented by Formula (IB). The multimeric compound contains a dimeric compound containing two structural units represented by Formula (II) in one molecule, and a ratio of the dimeric compound is from 15% by mass to 28% by mass with respect to the epoxy resin as a whole.

The term "multimeric compound" used herein refers to a compound containing two or more structural units represented by Formula (II) in one molecule.

In Formula (IA) and Formula (IB), each of $R^1$ to $R^4$ independently represents a hydrogen atom or an alkyl group having from 1 to 3 carbon atoms, preferably a hydrogen atom or an alkyl group having from 1 to 2 carbon atoms, more preferably a hydrogen atom or a methyl group, still more preferably a hydrogen atom.

Further, it is preferred that two to four of $R^1$ to $R^4$ are hydrogen atoms, it is more preferred that three or four of $R^1$ to $R^4$ are hydrogen atoms, and it is still more preferred that all of the four $R^1$ to $R^4$ are hydrogen atoms. When any one of $R^1$ to $R^4$ is an alkyl group having from 1 to 3 carbon atoms, it is preferred that at least one of $R^1$ or $R^4$ is an alkyl group having from 1 to 3 carbon atoms.

Specific examples of $R^1$ to $R^4$ in Formula (II) as well as preferred ranges thereof are the same as those of Formula (IA) and Formula (IB).

In Formula (IA) and Formula (IB), each $R^5$ independently represents an alkyl group having from 1 to 8 carbon atoms, preferably an alkyl group having from 1 to 3 carbon atoms, more preferably a methyl group.

In Formula (IA) and Formula (IB), n represents an integer from 0 to 4, preferably an integer from 0 to 2, more preferably an integer of 0 or 1, still more preferably 0. That is, the benzene rings to which $R^5$(s) is/are bound in Formula (IA) and Formula (IB) have preferably two to four hydrogen atoms, more preferably three or four hydrogen atoms, still more preferably four hydrogen atoms.

The number of the structural units represented by Formula (II) that are contained in the multimeric compound is arbitrary and not particularly restricted, and it is preferably 5 or less, more preferably 3 or less, in terms of average value.

In the disclosure, it is preferred that the structural unit represented by Formula (IA) is at least one selected from the group consisting of a structural unit represented by the following Formula (IA') and a structural unit represented by the following Formula (IA") and that the structural unit represented by Formula (IB) is at least one selected from the group consisting of a structural unit represented by the following Formula (IB') and a structural unit represented by the following Formula (IB"), and it is more preferred that the structural unit represented by Formula (IA) is a structural unit represented by the following Formula (IA') and that the structural unit represented by Formula (IB) is a structural unit represented by the following Formula (IB').

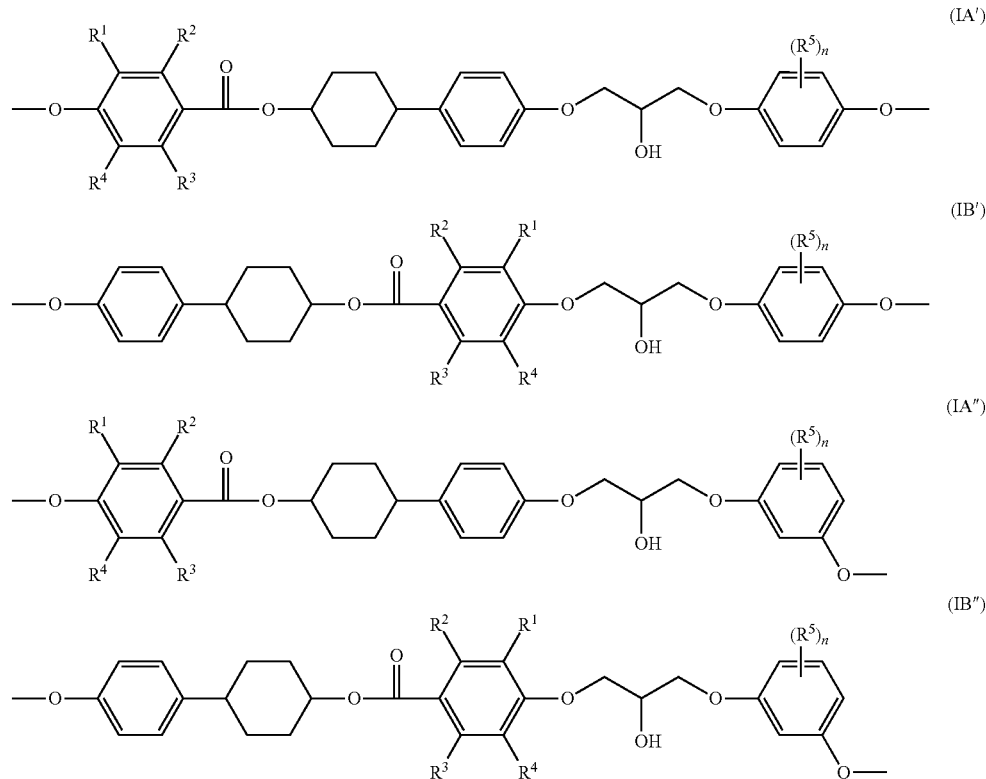

Specific examples of $R^1$ to $R^5$ and n in Formula (IA'), Formula (IB'), Formula (IA") and Formula (IB") as well as preferred ranges thereof are the same as those of Formula (IA) and Formula (IB).

The epoxy resin used in the disclosure contains a dimeric compound containing two structural units represented by the below-described Formula (II) in one molecule.

The dimeric compound containing two structural units represented by the below-described Formula (II) in one molecule is specifically, for example, at least one selected from the group consisting of a compound represented by the following Formula (II-A), a compound represented by the following Formula (II-B) and a compound represented by the following Formula (II-C).

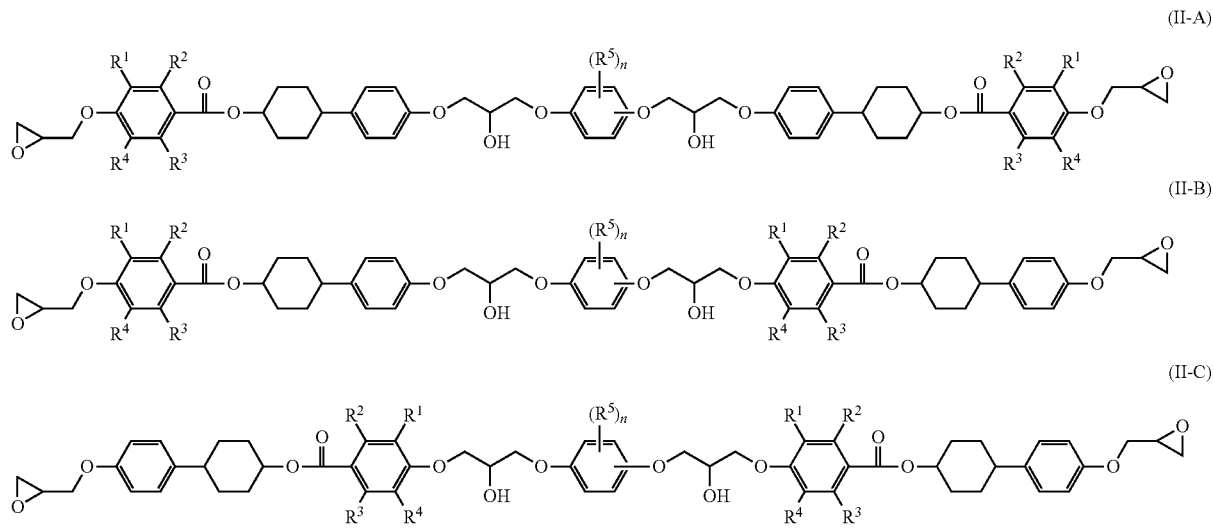

Specific examples of $R^1$ to $R^5$ and n in Formula (II-A), Formula (II-B) and Formula (II-C) as well as preferred ranges thereof are the same as those of Formula (IA) and Formula (IB).

When the multimeric compound contains at least one selected from the group consisting of a structural unit represented by Formula (IA') and a structural unit represented by Formula (IB'), the dimeric compound is specifically, for example, at least one selected from the group consisting of a compound represented by the following Formula (II-A'), a compound represented by the following Formula (II-B') and a compound represented by the following Formula (II-C').

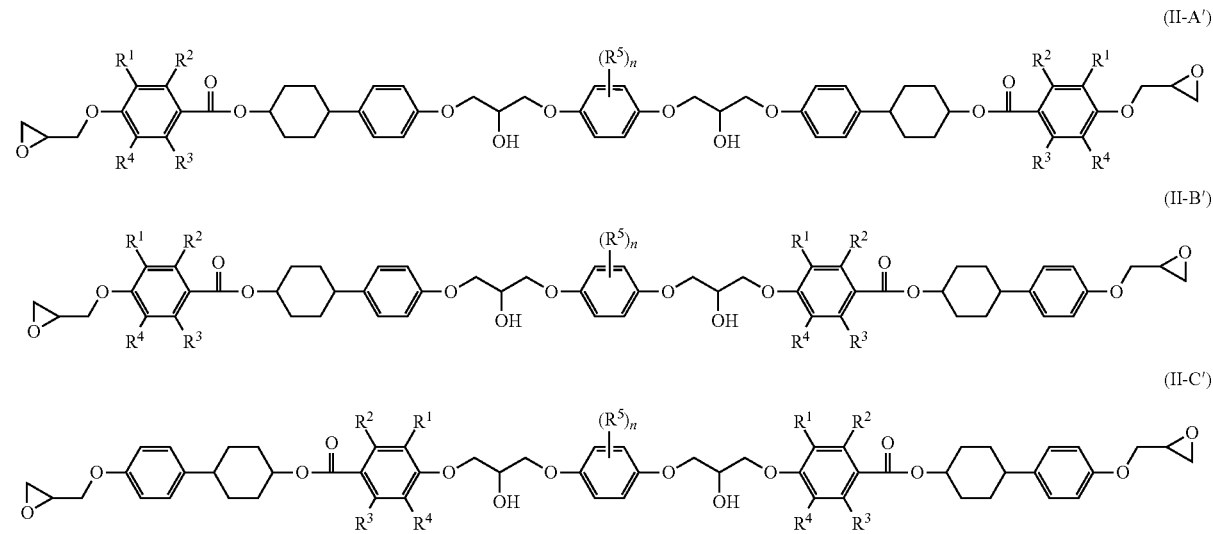

Specific examples of $R^1$ to $R^5$ and n in Formula (II-A'), Formula (II-B') and Formula (II-C') as well as preferred ranges thereof are the same as those of Formula (IA) and Formula (IB).

Further, when the multimeric compound contains at least one selected from the group consisting of a structural unit represented by Formula (IA") and a structural unit represented by Formula (IB"), the dimeric compound is specifically, for example, at least one selected from the group consisting of a compound represented by the following Formula (II-A"), a compound represented by the following Formula (II-B") and a compound represented by the following Formula (II-C").

The liquid chromatography is performed using LACHROM II C18 manufactured by Hitachi, Ltd. as an analytical column and tetrahydrofuran as an eluent at a flow rate of 1.0 ml/min. The UV spectrometer is used for detecting the absorbance at a wavelength of 280 nm. The mass spectrometer performs detection at an ionization voltage of 2,700 V.

The details of the synthesis method and evaluation of the epoxy resin are described below.

In the disclosure, the ratio of the dimeric compound is from 15% by mass to 28% by mass with respect to the epoxy resin as a whole. This ratio can be determined by the below-described reversed phase liquid chromatography (RPLC).

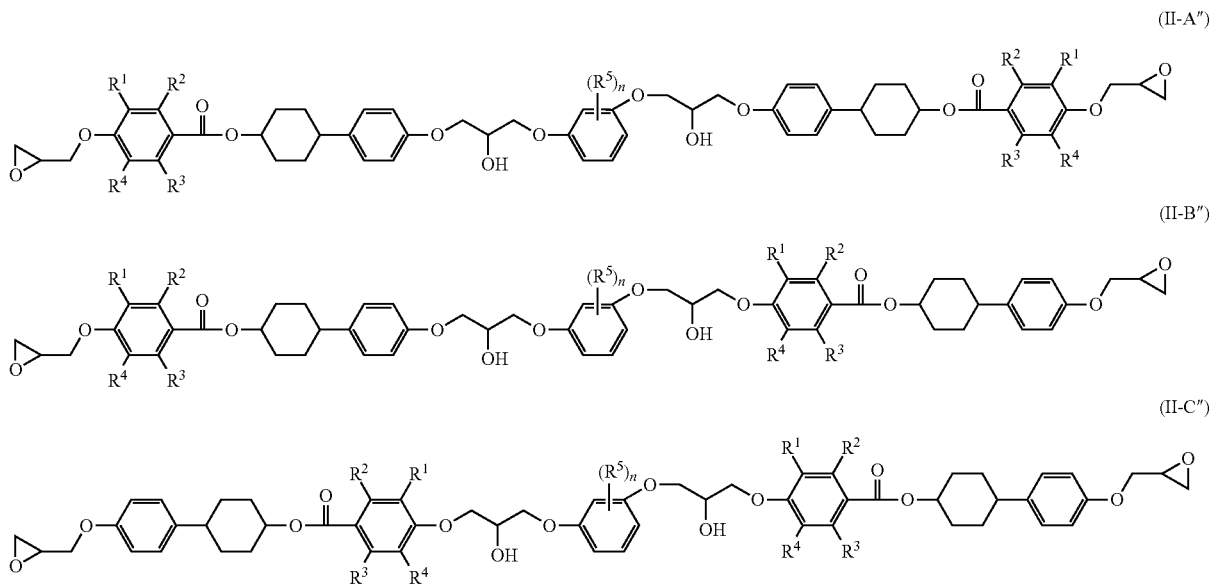

Specific examples of $R^1$ to $R^5$ and n in Formula (II-A"), Formula (II-B") and Formula (II-C") as well as preferred ranges thereof are the same as those of Formula (IA) and Formula (IB).

In the disclosure, as a specific example of the dimeric compound, the dimeric compound is preferably at least one selected from the group consisting of a compound represented by Formula (II-A'), a compound represented by Formula (II-B') and a compound represented by Formula (II-C').

The structures of these dimeric compounds can be determined by comparing the molecular weight of a structure presumed to be obtained by a reaction between an epoxy resin monomer represented by the below-described Formula When the ratio of the dimeric compound is lower than 15% by mass, since the melt viscosity of the epoxy resin is not reduced and this makes it difficult to mold the epoxy resin, a molded article cannot be produced, or the density of the resulting molded article tends to be reduced. Meanwhile, when the ratio of the dimeric compound is higher than 28% by mass, the cross-linking density of the resulting molded article is reduced, as a result of which the thermal conductivity and the Tg of the molded article tend to be lowered.

The ratio of the dimeric compound is preferably from 20% by mass to 27% by mass, more preferably from 22% by mass to 25% by mass.

The epoxy resin may also contain an epoxy resin monomer represented by the following Formula (I").

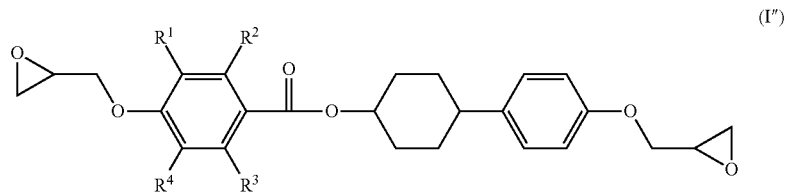

(I") used in the epoxy resin synthesis and a divalent phenol compound having two hydroxyl groups as substituents on a single benzene ring with the molecular weight of the target compound determined by liquid chromatography using a liquid chromatography apparatus equipped with a UV spectrometer and a mass spectrometer.

In Formula (I"), each of $R^1$ to $R^4$ independently represents a hydrogen atom or an alkyl group having from 1 to 3 carbon atoms.

Specific examples of $R^1$ to $R^4$ in Formula (I") as well as preferred ranges thereof are the same as those of Formula (IA) and Formula (IB).

The ratio of the epoxy resin monomer represented by Formula (I″) is preferably from 57% by mass to 80% by mass with respect to the epoxy resin as a whole.

When the ratio of the epoxy resin monomer is 57% by mass or higher, since this means, in other words, that the reaction product of the epoxy resin monomer represented by Formula (I″) and the divalent phenol compound is not excessively large, the cross-linking density of the resulting molded article is unlikely to be reduced, so that the thermal conductivity and the Tg of the molded article are unlikely to be reduced. Meanwhile, when the ratio of the epoxy resin monomer is 80% by mass or lower, since this means, in other words, that the reaction product of the epoxy resin monomer represented by Formula (I″) and the divalent phenol compound is not excessively small, it is not likely to be difficult to mold a molded article, or the cross-linking density of the resulting molded article does not tend to be reduced.

The ratio of the epoxy resin monomer represented by Formula (I″) is more preferably from 59% by mass to 74% by mass, still more preferably from 62% by mass to 70% by mass, with respect to the epoxy resin as a whole.

The epoxy resin used in the disclosure may further contain other epoxy resin component(s) in addition to the multimeric compound and the epoxy resin monomer represented by Formula (I″). The ratio of other epoxy resin component(s) with respect to the epoxy resin as a whole is preferably less than 15% by mass, more preferably 10% by mass or less, still more preferably 8% by mass or less, and it is particularly preferred that the epoxy resin contains substantially no other epoxy resin component.

The RPLC measurement in the present specification is performed using MIGHTYSIL RP-18 manufactured by Kanto Chemical Co., Inc. as an analytical RPLC column by a gradient method where the eluent mixing ratio (based on volume) is continuously changed from acetonitrile/tetrahydrofuran/water=20/5/75 to acetonitrile/tetrahydrofuran=80/20 (20 minutes from the start) and then to acetonitrile/tetrahydrofuran=50/50 (35 minutes from the start). The flow rate is set at 1.0 ml/min. In the present specification, the absorbance at a wavelength of 280 nm is detected, the area ratios of relevant peaks are determined taking the total area of all of the detected peaks as 100, and the thus obtained values are adopted as the content ratios [% by mass] of the respective compounds in the epoxy resin as a whole.

The epoxy equivalent of the epoxy resin is determined by perchloric acid titration.

From the standpoint of attaining both satisfactory fluidity of the epoxy resin composition and satisfactory thermal conductivity of the molded article, the epoxy equivalent is preferably from 245 g/eq to 300 g/eq, more preferably from 250 g/eq to 290 g/eq, still more preferably from 260 g/eq to 280 g/eq. When the epoxy equivalent of the epoxy resin is 245 g/eq or higher, since the crystallinity of the epoxy resin is not excessively high, the fluidity of the epoxy resin composition does not tend to be reduced. Meanwhile, when the epoxy equivalent of the epoxy resin is 300 g/eq or lower, since the cross-linking density of the epoxy resin is unlikely to be reduced, the thermal conductivity of the molded article tends to be increased.

Further, from the standpoint of attaining both satisfactory fluidity of the epoxy resin composition and satisfactory thermal conductivity of the molded article, the number-average molecular weight (Mn) of the epoxy resin, which is determined by gel permeation chromatography (GPC), is preferably from 400 to 800, more preferably from 450 to 750, still more preferably from 500 to 700. When the Mn of the epoxy resin is 400 or higher, since the crystallinity of the epoxy resin is not excessively high, the fluidity of the epoxy resin composition does not tend to be reduced. Meanwhile, when the Mn of the epoxy resin is 800 or less, since the cross-linking density of the epoxy resin is unlikely to be reduced, the thermal conductivity of the molded article tends to be increased.

The GPC measurement in the present specification is performed using G2000HXL and 3000HXL, which are manufactured by Tosoh Corporation, as analytical GPC columns along with tetrahydrofuran as a mobile phase at a sample concentration of 0.2% by mass and a flow rate of 1.0 ml/min. A calibration curve is prepared using a polystyrene standard sample, and the Mn is calculated in terms of polystyrene using the calibration curve.

The epoxy resin containing the multimeric compound can be synthesized by dissolving an epoxy resin monomer represented by Formula (I″), a divalent phenol compound having two hydroxyl groups as substituents on a single benzene ring and the below-described curing catalyst in a synthetic solvent and subsequently stirring the resultant with heating. The epoxy resin can also be synthesized by a method of melting the epoxy resin monomer and allowing the materials to react without the use of a solvent; however, it is necessary to increase the temperature to a point at which the epoxy resin monomer is melted. Therefore, from the safety standpoint, the synthesis method using a synthetic solvent is preferred.

The synthetic solvent is not particularly restricted as long as it can be heated to a temperature that is required for allowing a reaction to take place between the epoxy resin monomer represented by Formula (I″) and the divalent phenol compound having two hydroxyl groups as substituents on a single benzene ring.

Specific examples of the synthetic solvent include cyclohexanone, cyclopentanone, ethyl lactate, propylene glycol monomethyl ether, and N-methylpyrrolidone.

The amount of the synthetic solvent is an amount in which the epoxy resin monomer represented by Formula (I″), the divalent phenol compound having two hydroxyl groups as substituents on a single benzene ring, and the curing catalyst, can be dissolved at the reaction temperature or higher. Although the solubility varies depending on the types of the raw materials prior to the reaction, the type of the solvent and the like, by controlling the added solid concentration to be from 20% by mass to 60% by mass, the resin solution after the synthesis tends to have its viscosity in a preferred range.

Examples of the divalent phenol compound having two hydroxyl groups as substituents on a single benzene ring include catechol, resorcinol, hydroquinone, and derivatives thereof. Examples of the derivatives include compounds in which a benzene ring is substituted with an alkyl group having from 1 to 8 carbon atoms or the like. Among these divalent phenol compounds, it is preferred to use resorcinol and hydroquinone from the standpoint of improving the thermal conductivity of the molded article, and it is more preferred to use hydroquinone. Since hydroquinone has a structure in which a benzene ring is substituted with two hydroxyl groups at the para-positions, the multimeric compound obtained by a reaction between hydroquinone and an epoxy resin monomer is likely to have a linear structure. Accordingly, it is believed that a higher-order structure can be easily formed due to high stackability of molecules.

These divalent phenol compounds may be used singly, or in combination of two or more kinds thereof.

The type of the curing catalyst is not particularly restricted, and an appropriate curing catalyst can be selected from the standpoints of the reaction rate, the reaction temperature, the storage stability and the like. Specific examples of the curing catalyst include imidazole compounds, organic phosphorus compounds, tertiary amines, and quaternary ammonium salts. These curing catalysts may be used singly, or in combination of two or more kinds thereof. Thereamong, from the standpoint of the heat resistance of the molded article, the curing catalyst is preferably at least one selected from the group consisting of: organic phosphine compounds; compounds having intramolecular polarization that are obtained by adding a $\pi$ bond-containing compound, such as maleic anhydride, a quinone compound (e.g., 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone, or phenyl-1,4-benzoquinone), diazophenylmethane or a phenol resin, to an organic phosphine compound; and complexes formed by an organic phosphine compound and an organic boron compound (e.g., tetraphenyl borate, tetra-p-tolyl borate, or tetra-n-butyl borate).

Specific examples of the organic phosphine compounds include triphenyl phosphine, diphenyl(p-tolyl)phosphine, tris(alkylphenyl)phosphine, tris(alkoxyphenyl)phosphine, tris(alkylalkoxyphenyl)phosphine, tris(dialkylphenyl)phosphine, tris(trialkylphenyl)phosphine, tris(tetraalkylphenyl)phosphine, tris(dialkoxyphenyl)phosphine, tris(trialkoxyphenyl)phosphine, tris(tetraalkoxyphenyl)phosphine, trialkyl phosphine, dialkylaryl phosphine, and alkyldiaryl phosphine.

The amount of the curing catalyst is not particularly restricted. From the standpoints of the reaction rate and the storage stability, the amount of the curing catalyst is preferably from 0.1% by mass to 1.5% by mass, more preferably from 0.2% by mass to 1% by mass, with respect to the total mass of the epoxy resin monomer represented by Formula (I") and the divalent phenol compound having two hydroxyl groups as substituents on a single benzene ring.

The epoxy resin containing the multimeric compound can be synthesized using a glass flask for a small-scale production, or a stainless-steel synthesis tank for a large-scale production. A specific synthetic method is, for example, as follows.

First, the epoxy resin monomer represented by Formula (I") is loaded to a flask or a synthesis tank, and the synthetic solvent is further added thereto, after which the flask or the synthesis tank is heated to a reaction temperature in an oil bath or using a heat medium so as to dissolve the epoxy resin monomer. Then, the divalent phenol compound having two hydroxyl groups as substituents on a single benzene ring is added to the resultant and, after confirming that the divalent phenol compound has been dissolved in the synthetic solvent, the curing catalyst is further added to initiate the reaction. The resulting reaction solution is taken out after a prescribed period, whereby a solution of the epoxy resin containing the multimeric compound is obtained. Alternatively, by removing the synthetic solvent by distillation under reduced pressure with heating in the flask or the synthesis tank and taking out the resultant, the epoxy resin containing the multimeric compound can be obtained as a solid at room temperature (25° C.).

The reaction temperature is not restricted as long as it is a temperature at which the reaction between an epoxy group and a phenolic hydroxyl group proceeds in the presence of the curing catalyst, and the reaction temperature is, for example, preferably in a range of from 100° C. to 180° C., more preferably in a range of from 100° C. to 150° C. By controlling the reaction temperature at 100° C. or higher, the time required for completion of the reaction tends to be further shortened. Meanwhile, by controlling the reaction temperature at 180° C. or lower, the possibility of gelation tends to be reduced.

In the synthesis of the epoxy resin containing the multimeric compound, the equivalent ratio of the epoxy resin monomer represented by Formula (I") and the divalent phenol compound having two hydroxyl groups as substituents on a single benzene ring can be modified. Specifically, the synthesis can be carried out with the ratio (Ep/Ph) between the number of equivalents of the epoxy group of the epoxy resin monomer represented by Formula (I") (Eh) and the number of equivalents of the phenolic hydroxyl group of the divalent phenol compound having two hydroxyl groups as substituents on a single benzene ring (Ph) being set in a range of from 100/100 to 100/1. From the standpoints of the fluidity of the epoxy resin composition as well as the heat resistance and the thermal conductivity of the molded article, the ratio Ep/Ph is preferably in a range of from 100/18 to 100/10. By controlling the ratio Ep/Ph to be 100/10 or less, a reduction in the cross-linking density can be inhibited, and the heat resistance and the thermal conductivity of the molded article can be improved. Meanwhile, by controlling the ratio Ep/Ph to be 100/18 or higher, the softening point of the resulting multimeric compound can be lowered, so that the fluidity of the epoxy resin composition can be increased.

The multimeric compound and the epoxy resin represented by Formula (I") have a mesogen group in their molecular structures. It is described in Patent Document 1 that a cured product of an epoxy resin having a mesogen group in the molecular structure exhibits excellent thermal conductivity. Further, in WO 2013/065159, it is described that a high thermal conductivity and a high Tg can be realized by using the epoxy resin monomer represented by Formula (I") in combination with a novolac resin obtained by converting a divalent phenol compound into novolac.

The term "mesogen group" used herein refers to a functional group that facilitates expression of crystallinity or liquid crystallinity via intermolecular interaction. Specific representative examples thereof include a biphenyl group, a phenylbenzoate group, an azobenzene group, a stilbene group, and derivatives thereof.

Further, in WO 2013/065159, it is described that the epoxy resin monomer represented by Formula (I") forms a higher-order structure with a higher regularity around an inorganic filler, particularly an alumina filler, and thereby dramatically improves the thermal conductivity of the resulting cured product. This also applies to the epoxy resin containing the multimeric compound. The reason for this is believed to be because the cured product of the epoxy resin monomer forming a higher-order structure due to the presence of an inorganic filler acts as an efficient heat conduction path, enabling to attain a high thermal conductivity.

The term "higher-order structure" used herein means a structure containing a higher-order structural component in which the constituents thereof are arrayed and form a microscopically ordered structure, and the term corresponds to, for example, a crystal phase and a liquid-crystal phase. The presence or absence of such a higher-order structural component can be easily determined by observation under a polarizing microscope. That is, such a higher-order structural component can be distinguished with observation of an interference fringe formed by depolarization in a crossed Nicol state.

This higher-order structural component usually exists in a cured epoxy resin composition in the form of islands forming a domain structure, and each of the islands corresponds to a higher-order structural component. The constituents of the higher-order structure themselves are generally formed by covalent bonding.

The formation of a higher-order structure in a cured epoxy resin composition containing an inorganic filler can be confirmed as follows.

A cured product (thickness: from 0.1 to 20 μm) of a composition that is obtained by adding 5% by volume to 10% by volume of an inorganic filler (e.g., an alumina filler) to a mixture of an epoxy resin, a curing agent and a curing catalyst is prepared. The thus obtained cured product is then sandwiched between slide glass (thickness: about 1 mm) and, in this state, the cured product is observed under a polarizing microscope (e.g., BX51 manufactured by Olympus Corporation). An interference pattern is observed around the inorganic filler in a region where the inorganic filler exists; however, such an interference pattern is not observed in a region where the inorganic filler is absent. Based on this, it is determined whether or not the cured product of the epoxy resin forms a higher-order structure around the inorganic filler.

This observation is required to be performed not in a crossed Nicol state, but in a state where the analyzer is rotated by 60° with respect to the polarizer. When the cured product is observed in a crossed Nicol state, since the region where no interference pattern is observed (i.e., the region where a higher-order structure is not formed by the resin cured product) appears as a dark field, the region cannot be distinguished from the inorganic filler parts. However, the region where no interference pattern is observed does not appear as a dark field when the analyzer is rotated by 60° with respect to the polarizer, so that the region can be distinguished from the inorganic filler parts.

It is noted here that, generally, epoxy resin monomers having a mesogen group in their molecular structures are readily crystallized and have higher melting temperatures than widely used epoxy resin monomers. The epoxy resin monomer represented by Formula (I") also falls under such epoxy resin monomers. However, by partially polymerizing such an epoxy resin monomer into a multimeric compound, crystallization can be inhibited and the melting temperature can be lowered. Consequently, the moldability of the epoxy resin composition is improved.

Specifically, as described above, by allowing the epoxy resin monomer represented by Formula (I") and the divalent phenol compound having two hydroxyl groups as substituents on a single benzene ring to react with each other to form a multimeric compound, the above-described effects are likely to be obtained.

—Curing Agent—

The epoxy resin composition of the disclosure contains a curing agent. The type of the curing agent is not particularly restricted, and any conventionally known curing agent can be used. In the disclosure, the curing agent is preferably a novolac resin obtained by converting a divalent phenol compound(s) into novolac (hereinafter, may be referred to as "specific novolac resin").

Examples of the divalent phenol compounds include catechol, resorcinol, hydroquinone, 1,2-naphthalenediol, and 1,3-naphthalenediol. The "novolac resin obtained by converting a divalent phenol compound(s) into novolac" refers to a novolac resin obtained by linking these divalent phenol compounds via a methylene chain. The thermal conductivity of the molded article is improved by using a divalent phenol compound, and the heat resistance of the molded article is further improved by converting such a compound into novolac.

The specific novolac resin preferably contains a compound having a structural unit represented by at least one selected from the group consisting of the following Formula (II-1) and Formula (II-2).

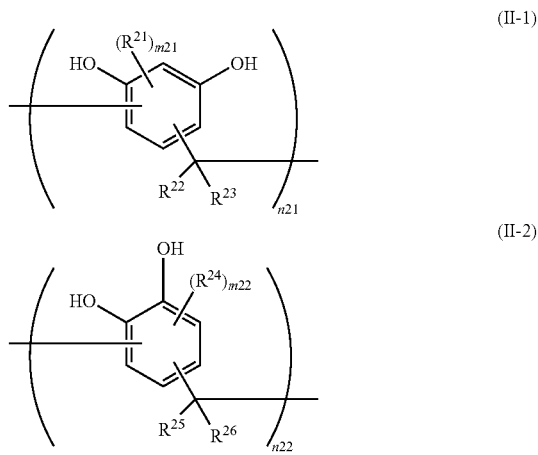

In Formula (II-1) and Formula (II-2), each of $R^{21}$ and $R^{24}$ independently represents an alkyl group, an aryl group, or an aralkyl group. The alkyl group, the aryl group and the aralkyl group represented by $R^{21}$ or $R^{24}$ may have a substituent. Examples of the substituent of the alkyl group include an aryl group, a hydroxyl group, and a halogen atom. Examples of the substituent of the aryl group and the aralkyl group include an alkyl group, an aryl group, a hydroxyl group, and a halogen atom.

Each of $R^{21}$ and $R^{24}$ independently represents an alkyl group, an aryl group or an aralkyl group, preferably an alkyl group having from 1 to 6 carbon atoms, an aryl group having from 6 to 12 carbon atoms or an aralkyl group having from 7 to 13 carbon atoms, more preferably an alkyl group having from 1 to 6 carbon atoms.

Further, each of m21 and m22 independently represents an integer from 0 to 2. When m21 is 2, the two $R^{21}$s may be the same or different and, when m22 is 2, the two $R^{24}$ may be the same or different. In the disclosure, each of m21 and m22 are independently preferably 0 or 1, more preferably 0.

Moreover, each of n21 and n22 independently represents an integer from 1 to 7, indicating the number of structural units represented by Formula (II-1) or structural units represented by Formula (II-2).

In Formula (II-1) and Formula (II-2), each of $R^{22}$, $R^{23}$, $R^{25}$ and $R^{26}$ independently represents a hydrogen atom, an alkyl group, an aryl group, or an aralkyl group. The alkyl group, the aryl group and the aralkyl group represented by $R^{22}$, $R^{23}$, $R^{25}$ or $R^{26}$ may have a substituent. Examples of the substituent of the alkyl group include an aryl group, a hydroxyl group, and a halogen atom. Examples of the substituent of the aryl group and the aralkyl group include an alkyl group, an aryl group, a hydroxyl group, and a halogen atom.

From the standpoints of the storage stability of the epoxy resin composition and the thermal conductivity of the molded article, $R^{22}$, $R^{23}$, $R^{25}$ and $R^{26}$ are each preferably a hydrogen atom, an alkyl group or an aryl group, more preferably a hydrogen atom, an alkyl group having from 1 to 4 carbon atoms or an aryl group having from 6 to 12 carbon atoms, still more preferably a hydrogen atom.

Further, from the standpoint of the heat resistance of the molded article, at least one of $R^{22}$ or $R^{23}$ or at least one of $R^{25}$ or $R^{26}$ is preferably an aryl group, more preferably an aryl group having from 6 to 12 carbon atoms.

The aryl group may contain a hetero atom in its aromatic group and is preferably a heteroaryl group whose total number of hetero atoms and carbon atoms is from 6 to 12.

In the specific novolac resin, a compound having a structural unit represented by Formula (II-1) or a structural unit represented by Formula (II-2) may be contained singly, or in combination of two or more kinds thereof. From the standpoint of the thermal conductivity of the molded article, the curing agent preferably contains at least a compound having a structural unit represented by Formula (II-1), more preferably contains at least a compound having a structural unit that is represented by Formula (II-1) and derived from resorcinol.

When the compound having the structural unit represented by Formula (II-1) has a structural unit derived from resorcinol, the compound may further contain at least one partial structure derived from a phenol compound other than resorcinol. In the compound having the structural unit represented by Formula (II-1), examples of the phenol compound other than resorcinol include phenol, cresol, catechol, hydroquinone, 1,2,3-trihydroxybenzene, 1,2,4-trihydroxybenzene, and 1,3,5-trihydroxybenzene. In the compound having the structural unit represented by Formula (II-1), a partial structure derived from any of these phenol compounds may be contained singly, or in combination of two or more kinds thereof.

Similarly, a compound having a structural unit that is represented by Formula (II-2) and derived from catechol may also contain at least one partial structure derived from a phenol compound other than catechol.

The term "partial structure derived from a phenol compound" used herein means a monovalent or divalent group formed by removing one or two hydrogen atoms from an aromatic ring moiety of a phenol compound. The position(s) of the hydrogen atom(s) to be removed is/are not particularly restricted.

In the compound having the structural unit represented by Formula (II-1), from the standpoints of the thermal conductivity of the molded article as well as the adhesiveness and the storage stability of the epoxy resin composition, the partial structure derived from a phenol compound other than resorcinol is preferably a partial structure derived from at least one selected from the group consisting of phenol, cresol, catechol, hydroquinone, 1,2,3-trihydroxybenzene, 1,2,4-trihydroxybenzene and 1,3,5-trihydroxybenzene, more preferably a partial structure derived from at least one selected from catechol and hydroquinone.

When the compound having the structural unit represented by Formula (II-1) contains a structural unit derived from resorcinol, the content ratio of the partial structure derived from resorcinol is not particularly restricted. The content ratio of the partial structure derived from resorcinol with respect to the total mass of the compound having the structural unit represented by Formula (II-1) is preferably not less than 55% by mass from the standpoint of elastic modulus; more preferably not less than 60% by mass, still more preferably not less than 80% by mass, from the standpoints of the Tg and the linear expansion coefficient of the molded article; and particularly preferably not less than 90% by mass from the standpoint of the thermal conductivity of the molded article.

It is also preferred that the specific novolac resin contains a compound having a structure represented by at least one selected from the group consisting of the following Formulae (III-1) to (III-4).

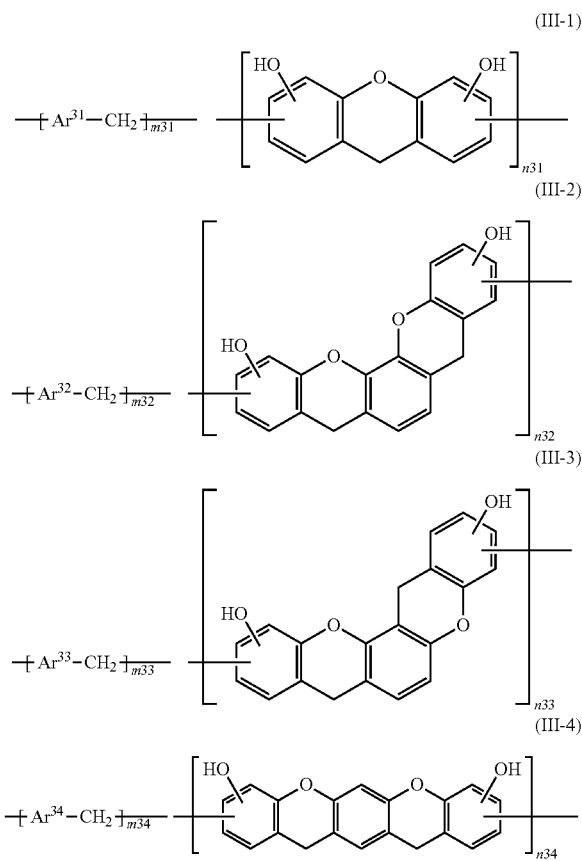

In Formula (III-1) to Formula (III-4), each of m31 to m34 and n31 to n34 independently represents a positive integer. Each of $Ar^{31}$ to $Ar^{34}$ independently represents a group represented by the following Formula (III-a) or a group represented by the following Formula (III-b).

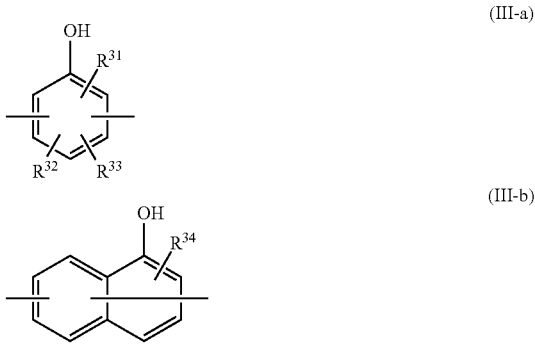

In Formula (III-a) and Formula (III-b), each of $R^{31}$ and $R^{34}$ independently represents a hydrogen atom or a hydroxyl group. Each of $R^{32}$ and $R^{33}$ independently represents a hydrogen atom or an alkyl group having from 1 to 8 carbon atoms.

The specific novolac resin having a structure represented by at least one selected from the group consisting of Formula (III-1) to Formula (III-4) can be generated as a by-product in the below-described production method where a divalent phenol compound is converted into novolac.

The structure represented by at least one selected from the group consisting of Formula (III-1) to Formula (III-4) may be contained in the specific novolac resin as a main chain skeleton, or as a part of a side chain. Further, the respective structural units constituting the structure represented by any one of Formula (III-1) to Formula (III-4) may be contained randomly or regularly, or in a block form.

In Formula (III-1) to Formula (III-4), the positions of the substitutions with hydroxyl groups are not particularly restricted as long as they are on the respective aromatic rings.

The plural $Ar^{31}$s to $Ar^{34}$s in each of Formula (III-1) to Formula (III-4) may all be the same atomic group, or may include two or more atomic groups. It is noted here that each of $Ar^{31}$ to $Ar^{34}$ independently represents a group represented by Formula (III-a) or a group represented by Formula (III-b).

In Formula (III-a) and Formula (III-b), each of $R^{31}$ and $R^{34}$ are independently a hydrogen atom or a hydroxyl group and, from the standpoint of the thermal conductivity of the molded article, $R^{31}$ and $R^{34}$ are preferably hydroxyl groups. The positions of the substitutions with $R^{31}$ and $R^{34}$ are not particularly restricted.

In Formula (III-a), each of $R^{32}$ and $R^{33}$ independently represent a hydrogen atom or an alkyl group having from 1 to 8 carbon atoms. Examples of the alkyl group having from 1 to 8 carbon atoms that is represented by $R^{32}$ and $R^{33}$ include a methyl group, an ethyl group, a propyl group, a butyl group, an isopropyl group, an isobutyl group, a t-butyl group, a pentyl group, a hexyl group, a heptyl group, and an octyl group. The positions of the substitutions with $R^{32}$ and $R^{33}$ in Formula (III-a) are not particularly restricted.

In Formula (III-1) to Formula (III-4), from the standpoint of attaining a molded article having excellent thermal conductivity, it is preferred that each of $Ar^{31}$ to $Ar^{34}$ are independently at least one selected from a group derived from dihydroxybenzene (i.e., a group represented by Formula (III-a) wherein $R^{3'}$ is a hydroxyl group, and $R^{32}$ and $R^{33}$ are hydrogen atoms) or a group derived from dihydroxynaphthalene (i.e., a group represented by Formula (III-b) wherein $R^{34}$ is a hydroxyl group).

The term "a group derived from dihydroxybenzene" used herein means a divalent group formed by removing two hydrogen atoms from the aromatic ring moiety of dihydroxybenzene, and the positions of the hydrogen atoms to be removed are not particularly restricted. The terms "a group derived from dihydroxynaphthalene" and the like used herein also have comparable meanings.

From the standpoints of the productivity and the fluidity of the epoxy resin composition, each of $Ar^{31}$ to $Ar^{34}$ are independently preferably a group derived from dihydroxybenzene, more preferably at least one selected from the group consisting of a group derived from 1,2-dihydroxybenzene (catechol) and a group derived from 1,3-dihydroxybenzene (resorcinol). From the standpoint of particularly improving the thermal conductivity of the molded article, it is preferred that $Ar^{31}$ to $Ar^{34}$ contain at least a group derived from resorcinol.

Further, from the standpoint of particularly improving the thermal conductivity of the molded article, the structural units, the numbers of which are represented by n31 to n34, each preferably contain at least a partial structure derived from resorcinol.

When the specific novolac resin contains a partial structure derived from resorcinol, the content ratio of the partial structure derived from resorcinol is preferably not less than 55% by mass, more preferably not less than 60% by mass, still more preferably not less than 80% by mass, particularly preferably not less than 90% by mass, with respect to the total mass of the compound having a structure represented by at least one of Formula (III-1) to Formula (III-4).

With regard to m31 to m34 and n31 to n34 in Formula (III-1) to Formula (III-4), from the standpoint of the fluidity of the epoxy resin composition, the value of m/n is preferably from 1/5 to 20/1, more preferably from 5/1 to 20/1, still more preferably from 10/1 to 20/1. Further, from the standpoint of the fluidity of the epoxy resin composition, the value of (m+n) is preferably not greater than 20, more preferably not greater than 15, still more preferably not greater than 10. The lower limit value of (m+n) is not particularly restricted. It is noted here that, when n is n31, m is m31; when n is n32, m is m32; when n is n33, m is m33; and when n is n34, m is m34.

Particularly when $Ar^{31}$ to $Ar^{34}$ are each at least one of substituted or unsubstituted dihydroxybenzene or substituted or unsubstituted dihydroxynaphthalene, a novolac resin having a structure represented by at least one selected from the group consisting of Formula (III-1) to Formula (III-4) is easily synthesized as compared to novolac resins and the like that are obtained by simple conversion of these compounds into novolac, and the resulting novolac resin tends to have a low softening point. Accordingly, there is an advantage that a resin composition containing such a novolac resin as a curing agent is easily produced and handled.

Whether or not a novolac resin has a partial structure represented by at least one of Formula (III-1) to Formula (III-4) can be determined by field desorption ionization mass spectrometry (FD-MS) on the basis of whether or not a component corresponding to the partial structure represented by at least one of Formula (III-1) to Formula (III-4) is contained as a fragment component of FD-MS.

The molecular weight of the specific novolac resin is not particularly restricted. From the standpoint of the fluidity of the epoxy resin composition, the number-average molecular weight (Mn) is preferably 2,000 or less, more preferably 1,500 or less, still more preferably from 350 to 1,500. Further, the weight-average molecular weight (Mw) is preferably 2,000 or less, more preferably 1,500 or less, still more preferably from 400 to 1,500.

The Mn and the Mw are measured by an ordinary method using GPC.

The hydroxyl equivalent of the specific novolac resin is not particularly restricted. From the standpoint of the crosslinking density that relates to the heat resistance of the molded article, the average hydroxyl equivalent is preferably from 50 g/eq to 150 g/eq, more preferably from 50 g/eq to 120 g/eq, still more preferably from 55 g/eq to 120 g/eq.

The curing agent may also contain a monomer that is the same as a phenol compound constituting the specific novolac resin. A content ratio of the monomer, which is the same as a phenol compound constituting the specific novolac resin (hereinafter, also referred to as "monomer content ratio"), is not particularly restricted. From the standpoints of the thermal conductivity and the heat resistance of the molded article as well as the moldability of the epoxy resin composition, the monomer content ratio is preferably from 10% by mass to 50% by mass, more preferably from 15% by mass to 45% by mass, still more preferably from 20% by mass to 40% by mass.

When the monomer content ratio is 50% by mass or less, since the amount of the monomer not contributing to cross-linking during a curing reaction is small and the amount of a high-molecular-weight material to be cross-linked is large, a higher-order structure having a higher density is formed, so that the thermal conductivity of the molded article tends to be improved. Meanwhile, when the monomer content ratio is 10% by mass or higher, since the epoxy resin composition easily flows during molding, its adhesion with a filler is further improved, so that the resulting molded article tends to attain superior thermal conductivity and heat resistance.

The amount of the curing agent to be contained in the epoxy resin composition is not particularly restricted. The ratio between the active hydrogen equivalent of the phenolic hydroxyl groups in the curing agent (phenolic hydroxyl equivalent) and the epoxy equivalent of the epoxy resin (phenolic hydroxyl equivalent/epoxy equivalent) is preferably from 0.5 to 2, more preferably from 0.8 to 1.2.

The epoxy resin composition may further contain a curing catalyst as required. By incorporating a curing catalyst, the epoxy resin composition can be cured more sufficiently. The type and the content ratio of the curing catalyst are not particularly restricted and can be selected as appropriate from the standpoints of the reaction rate, the reaction temperature, the storage property and the like. Specific examples of the curing catalyst include imidazole compounds, organic phosphorus compounds, tertiary amines, and quaternary ammonium salts. These curing catalysts may be used singly, or in combination of two or more kinds thereof.

Thereamong, from the standpoint of the heat resistance of the molded article, the curing catalyst is preferably at least one selected from the group consisting of organic phosphine compounds and complexes of an organic phosphine compound and an organic boron compound.

Specific examples of the organic phosphine compounds include triphenyl phosphine, diphenyl(p-tolyl)phosphine, tris(alkylphenyl)phosphine, tris(alkoxyphenyl)phosphine, tris(alkylalkoxyphenyl)phosphine, tris(dialkylphenyl)phosphine, tris(trialkylphenyl)phosphine, tris(tetraalkylphenyl)phosphine, tris(dialkoxyphenyl)phosphine, tris(trialkoxyphenyl)phosphine, tris(tetraalkoxyphenyl)phosphine, trialkyl phosphine, dialkylaryl phosphine, and alkyldiaryl phosphine.

Specific examples of the complexes of an organic phosphine compound and an organic boron compound include tetraphenyl phosphonium tetraphenyl borate, tetraphenyl phosphonium tetra-p-tolyl borate, tetrabutyl phosphonium tetraphenyl borate, tetraphenyl phosphonium butyltriphenyl borate, butyltriphenyl phosphonium tetraphenyl borate, and methyltributyl phosphonium tetraphenyl borate.

These curing catalysts may be used singly, or in combination of two or more kinds thereof. As a method of efficiently preparing the below-described semi-cured epoxy resin composition and cured epoxy resin composition, for example, a method which uses a mixture of two curing catalysts having different initiation temperatures and rates for the reaction of the epoxy resin and the curing agent may be employed.

When two or more curing catalysts are used in combination, their mixing ratio is not particularly restricted and can be decided in accordance with the properties desired for the resulting semi-cured epoxy resin and cured epoxy resin composition.

When the epoxy resin composition contains a curing catalyst(s), from the standpoint of the moldability of the epoxy resin composition, the content ratio of the curing catalyst(s) is preferably from 0.5% by mass to 1.5% by mass, more preferably from 0.5% by mass to 1% by mass, still more preferably from 0.75% by mass to 1% by mass, with respect to the total mass of the epoxy resin and the curing agent.

—Inorganic Filler—

The epoxy resin composition may also contain an inorganic filler. By using an inorganic filler, the thermal conductivity of the molded article tends to be improved.

The inorganic filler may be non-electroconductive or electroconductive. The risk of a reduction in the electrical insulation of the molded article can be lowered by using a non-electroconductive inorganic filler, and the thermal conductivity of the molded article is further improved by using an electroconductive inorganic filler.

The term "non-electroconductive inorganic filler" used herein refers to an inorganic filler having a volume resistivity of not less than $10^{12}$ Ωcm. Meanwhile, the term "electroconductive inorganic filler" used herein refers to an inorganic filler having a volume resistivity of not higher than $10^{-5}$ Ωcm.

Specific examples of the material of the non-electroconductive inorganic filler include boron nitride, alumina, silica, aluminum nitride, magnesium oxide, silicon oxide, aluminum hydroxide, and barium sulfate. Examples of the material of the electroconductive inorganic filler include gold, silver, nickel, copper, and graphite.

From the standpoint of the electrical insulation of the molded article, the inorganic filler is preferably a non-electroconductive inorganic filler and, among non-electroconductive inorganic fillers, the inorganic filler is more preferably at least one selected from the group consisting of alumina, boron nitride, aluminum nitride, silica and magnesium oxide. Further, for the same reasons as described in WO 2013/065159, the inorganic filler preferably contains at least alumina.

These inorganic fillers may be used singly, or in combination of two or more kinds thereof as a mixture. For example, boron nitride and alumina may be used in combination; however, the combination is not restricted thereto.

When the epoxy resin composition contains an inorganic filler, the content ratio of the inorganic filler in the epoxy resin composition is not particularly restricted. For example, the content ratio of the inorganic filler is preferably from 60% by volume to 90% by volume with respect to the solid content of the epoxy resin composition. When the content ratio of the inorganic filler in the epoxy resin composition is 60% by volume or higher, the thermal conductivity of the molded article tends to be improved. Meanwhile, when the content ratio of the inorganic filler is 90% by volume or lower, the moldability and the adhesiveness of the epoxy resin composition tend to be further improved. From the standpoint of improving the thermal conductivity of the molded article, the content ratio of the inorganic filler is more preferably from 65% by volume to 85% by volume, still more preferably from 70% by volume to 85% by volume, with respect to the solid content of the epoxy resin composition.

In the present specification, the content ratio (% by volume) of the inorganic filler is a value determined by the following equation.

$$\text{Content ratio (\% by volume) of inorganic filler} = \{(D_w/D_d)/((A_w/A_d)+(B_w/B_d)+(C_w/C_d)+(D_w/D_d)+(E_w/E_d)+(F_w/F_d)\} \times 100$$

The variables in this equation are as follows.

Aw: Mass composition ratio (% by mass) of epoxy resin
Bw: Mass composition ratio (% by mass) of curing agent
Cw: Mass composition ratio (% by mass) of curing catalyst (optional component)
Dw: Mass composition ratio (% by mass) of inorganic filler
Ew: Mass composition ratio (% by mass) of silane coupling agent (optional component)
Fw: Mass composition ratio (% by mass) of other optional component(s)
Ad: Specific gravity of epoxy resin
Bd: Specific gravity of curing agent
Cd: Specific gravity of curing catalyst (optional component)
Dd: Specific gravity of inorganic filler
Ed: Specific gravity of silane coupling agent (optional component)
Fd: Specific gravity of other optional component(s)

The inorganic filler may have a single peak or plural peaks in its particle size distribution curve drawn by plotting the particle size on the abscissa and the frequency on the ordinate. By using an inorganic filler having plural peaks in the particle size distribution curve, the filling of the inorganic filler is further improved, and the thermal conductivity of the molded article is thus further improved.

When the inorganic filler has a single peak in its particle size distribution curve, from the standpoint of the thermal conductivity of the molded article, the average particle size (D50), which is the particle size corresponding to a cumulative weight of 50% from the smaller particle size side of the cumulative-weight particle size distribution of the inorganic filler, is preferably from 0.1 µm to 100 more preferably from 0.1 µm to 70 µm. An inorganic filler having plural peaks in its particle size distribution curve can be formed by, for example, a combination of two or more kinds of fillers having different D50 values.

The D50 of the inorganic filler, which is measured by a laser diffraction method, corresponds to the particle size at a cumulative weight of 50% from the smaller particle size side of a weight-cumulative particle size distribution curve. The measurement of the particle size distribution by a laser diffraction method can be performed using a laser diffraction-scattering particle size distribution analyzer (e.g., LS230 manufactured by Beckman Coulter, Inc.).

When a combination of two inorganic fillers having different average particle sizes are used, the combination of the inorganic fillers is, for example, a mixed filler of an inorganic filler (A) whose D50 is from 20 µm to 100 µm and an inorganic filler (B) whose D50 is ½ or less of that of the inorganic filler (A) and is from 0.1 µm to 50 In this mixed filler, it is preferred that, based on the total volume (100% by volume) of the inorganic fillers, the ratio of the inorganic filler (A) is from 50% by volume to 90% by volume and that of the inorganic filler (B) is from 10% by volume to 50% by volume (provided that the total volume (% by volume) of the inorganic fillers (A) and (B) is 100% by volume).

When a combination of three inorganic fillers having different average particle sizes are used, the combination of the inorganic fillers is, for example, a mixed filler of an inorganic filler (A') whose D50 is from 20 µm to 100 an inorganic filler (B') whose D50 is ½ or less of that of the inorganic filler (A') and is from 10 µm to 50 and an inorganic filler (C') whose D50 is ½ or less of that of the inorganic filler (B') and is from 0.1 µm to 20 µm. In this mixed filler, it is preferred that, based on the total volume (100% by volume) of the inorganic fillers, the ratio of the inorganic filler (A') is 20% by volume to 89% by volume, the ratio of the inorganic filler (B') is from 10% by volume to 50% by volume, and the ratio of the inorganic filler (C') is from 1% by volume to 30% by volume (provided that the total volume (% by volume) of the inorganic fillers (A'), (B') and (C') is 100% by volume).

In the case of applying the epoxy resin composition to the below-described molded article and cured molded article, it is preferred to select the D50 of the inorganic filler (A) and that of the inorganic filler (A') as appropriate in accordance with the desired thickness of the molded article or the cured molded article.

The epoxy resin composition may further contain, as required, an inorganic filler having a D50 value of from 1 nm to less than 100 nm.

—Silane Coupling Agent—

The epoxy resin composition of the disclosure may also contain a silane coupling agent as required.

When the epoxy resin composition contains a silane coupling agent, the content ratio of the silane coupling agent in the epoxy resin composition is not particularly restricted. For example, the content ratio of the silane coupling agent is preferably from 0.01% by mass to 0.1% by mass with respect to the solid content of the epoxy resin composition.

When a silane coupling agent is used, the silane coupling agent is not particularly restricted; however, it is preferred to use a phenyl group-containing silane coupling agent. The ratio of the phenyl group-containing silane coupling agent is preferably not less than 50% by mass, more preferably not less than 80% by mass, still more preferably not less than 90% by mass, with respect to the whole silane coupling agent.

As effects of incorporating a silane coupling agent, the fluidity of the epoxy resin composition is improved and the thermal conductivity of the molded article is enhanced by interaction between the surface of the inorganic filler and the epoxy resin surrounding the inorganic filler. In addition, since infiltration of water into the molded article can be inhibited, the use of a silane coupling agent tends to contribute to an improvement in the insulation reliability of the molded article. Particularly, since a phenyl group-containing silane coupling agent is likely to interact with an epoxy resin having a mesogen skeleton, it allows the molded article to attain superior thermal conductivity. In order to bring the surface of the inorganic filler and the epoxy resin surrounding the inorganic filler closer to each other and thereby achieving a molded article having excellent thermal conductivity, it is preferred that the phenyl group-containing silane coupling agent contains a silane coupling agent in which a phenyl group is directly bound to a silicon atom (Si).

In the phenyl group-containing silane coupling agent, the ratio of the silane coupling agent in which a phenyl group is directly bound to a silicon atom (Si) is preferably not less than 30% by mass, more preferably not less than 50% by mass, still more preferably not less than 80% by mass.

The type of the phenyl group-containing silane coupling agent is not particularly restricted, and any commercially available one may be used. Specific examples thereof include 3-phenylaminopropyltrimethoxysilane, 3-phenylaminopropyltriethoxysilane, N-methylanilinopropyltrimethoxysilane, N-methyl anilinopropyltriethoxysilane, 3-phenyliminopropyltrimethoxysilane, 3-phenyliminopropyltriethoxysilane, phenyltrimethoxysilane, phenyltriethoxysilane, diphenyldimethoxysilane, diphenyldiethoxysilane, triphenylmethoxysilane, and triphenylethoxysilane. These silane coupling agents may be used singly, or in combination of two or more kinds thereof.

As long as the silane coupling agent is contained in the epoxy resin composition, the silane coupling agent may exist in the state of coating the surface of the inorganic filler, or may exist by itself in the epoxy resin composition.

The method of adding the silane coupling agent to the epoxy resin composition is not particularly restricted. Specifically, for example, an integral method of adding the silane coupling agent at the time of mixing other materials (e.g., epoxy resin and inorganic filler), a masterbatch method of mixing a certain amount of the silane coupling agent with a small amount of a resin and subsequently mixing the resultant with other materials (e.g., inorganic filler), or a pretreatment method of treating the surface of the inorganic filler with the silane coupling agent in advance by mixing the inorganic filler and the silane coupling agent before mixing them with other materials (e.g., epoxy resin), may be employed. Examples of the pretreatment method include a dry method in which a stock solution or a solution of the silane coupling agent is dispersion-treated along with the inorganic filler by rapid stirring, and a wet method in which the surface of the inorganic filler is treated with the silane coupling agent by preparing a slurry of the inorganic filler using a diluted solution of the silane coupling agent or by immersing the silane coupling agent in the inorganic filler.

The amount of silane coupling agent-derived silicon atoms adhered per specific surface area of the inorganic filler is preferably from $5.0 \times 10^{-6}$ mol/m$^2$ to $10.0 \times 10^{-6}$ mol/m$^2$, more preferably from $5.5 \times 10^{-6}$ mol/m$^2$ to $9.5 \times 10^{-6}$ mol/m$^2$, still more preferably from $6.0 \times 10^{-6}$ mol/m$^2$ to $9.0 \times 10^{-6}$ mol/m$^2$.

The method of measuring the amount of silane coupling agent-derived silicon atoms adhered per specific surface area of the inorganic filler is as follows.

First, a BET method is mainly applied as the method of measuring the specific surface area of the inorganic filler. The BET method is a gas adsorption method in which inert gas molecules, such as nitrogen ($N_2$), argon (Ar) or krypton (Kr), are allowed to adsorb to solid particles and the specific surface area of the solid particles is determined from the amount of the thus adsorbed gas molecules. The measurement of the specific surface area can be performed using a specific surface area/pore distribution analyzer (e.g., SA3100 manufactured by Beckman Coulter, Inc.).

Further, the silane coupling agent-derived silicon atoms existing on the surface of the inorganic filler can be quantitatively measured by $^{29}$Si CP/MAS (Cross Polarization/Magic Angle Spinning) solid-state NMR (Nuclear Magnetic Resonance). Since CP/MAS solid-state NMR (e.g., JNM-ECA700 manufactured by JEOL Ltd.) has a high resolution, even when the inorganic filler contains silica, silica-derived silicon atoms of the inorganic filler can be distinguished from the silane coupling agent-derived silicon atoms.

In cases where the inorganic filler does not contain silica, the silane coupling agent-derived silicon atoms can also be quantified using a fluorescent X-ray analyzer (e.g., SUPER-MINI 200 manufactured by Rigaku Corporation).

The amount of silane coupling agent-derived silicon atoms adhered per specific surface area of the inorganic filler is calculated based on the specific surface area of the inorganic filler and the amount of the silane coupling agent-derived silicon atoms existing on the surface of the inorganic filler, which are determined in the above-described manner.

—Other Components—

In the epoxy resin composition of the disclosure, a release agent may also be incorporated as required. Examples of the release agent include oxidized or non-oxidized polyolefins, carnauba wax, montanoic acid esters, montanoic acid and stearic acid, and these release agents may be used singly, or in combination of two or more kinds thereof.

Further, in the epoxy resin composition of the disclosure, a stress release agent (e.g., silicone oil or silicone rubber powder), a reinforcing material (e.g., glass fiber) and/or the like may also be incorporated as required.

The epoxy resin composition of the disclosure can be prepared by any method as long as it is capable of dispersing and mixing various components. For example, in cases where a molded article and a cured molded article are to be produced, a method in which prescribed amounts of the respective components are sufficiently mixed using a mixer or the like and the resulting mixture is subsequently melt-kneaded using a mixing roll, an extruder or the like, followed by cooling and pulverization of the resultant, may be employed. Specifically, the epoxy resin composition can be obtained by a method of stirring and mixing prescribed amounts of the above-described components and subsequently kneading the resulting mixture using a kneader, a roll, an extruder or the like that has been heated in advance to a temperature of from 70° C. to 140° C., followed by cooling, pulverization and the like of the resultant. For the production of a molded article and a cured molded article, the epoxy resin composition can be more easily used in the form of a tablet having such dimensions and mass that conform to the molding conditions.

<Semi-Cured Epoxy Resin Composition>

The semi-cured epoxy resin composition of the disclosure is a semi-cured product of the epoxy resin composition of the disclosure. The semi-cured epoxy resin composition of the disclosure is derived from the epoxy resin composition of the disclosure and can be obtained by semi-curing the epoxy resin composition of the disclosure.

In the present specification, the term "semi-cured epoxy resin composition" means a semi-cured product of an epoxy resin composition whose resin component is melted when heated to a temperature of from 80° C. to 120° C. and whose viscosity is thereby reduced to a range of from 10 Pa·s to $10^4$ Pa·s. Meanwhile, in the below-described cured epoxy resin composition, the resin component is not melted by heating. The viscosity is measured using a dynamic viscoelasticity analyzer (DMA) (e.g., ARES-2KSTD manufactured by TA Instruments Inc.). As for the measurement conditions, the measurement is performed at a frequency of 1 Hz by a shear test.

The semi-curing can be performed by, for example, a method of heating the epoxy resin composition at a temperature of from 50° C. to 180° C. for a period of from 1 minute to 30 minutes.

<Cured Epoxy Resin Composition>

The cured epoxy resin composition of the disclosure is a cured product of the epoxy resin composition of the disclosure. The cured epoxy resin composition of the disclosure is derived from the epoxy resin composition of the disclosure and can be obtained by curing the epoxy resin composition of the disclosure. The cured epoxy resin composition of the disclosure has excellent thermal conductivity. This is believed to be attributed to, for example, formation of a higher-order structure around the inorganic filler by the epoxy resin contained in the epoxy resin composition.

The cured epoxy resin composition of the disclosure can be produced by curing the epoxy resin composition in an uncured state or the semi-cured epoxy resin composition of the disclosure. The curing method can be selected as appropriate in accordance with the constitution of the epoxy resin composition, the intended purpose of the resulting cured epoxy resin composition and the like, and a heat-press treatment is preferably employed.

The curing can be performed by, for example, a method of heating the epoxy resin composition in an uncured state at a temperature of from 100° C. to 250° C. for a period of from 30 minutes to 600 minutes. Preferably, a method of preparing a semi-cured epoxy resin composition from the epoxy resin composition in an uncured state by the above-described method, subsequently heating the thus obtained semi-cured epoxy resin composition at a temperature of from 100° C. to 200° C. for a period of from 1 minute to 30 minutes, and then further heating the resultant at a temperature of from 150° C. to 250° C. for a period of from 60 minutes to 300 minutes, is employed.

<Molded Article and Cured Molded Article>

The molded article of the disclosure is produced by press-molding the epoxy resin composition of the disclosure. Further, the cured molded article of the disclosure is produced by post-curing the molded article of the disclosure by heating.

As the method of press-molding the epoxy resin composition of the disclosure, a transfer molding method is most commonly employed. As the press-molding method, a compression molding method or the like may be employed as well. In the disclosure, the mold temperature during the press-molding is preferably from 100° C. to 200° C., more preferably from 120° C. to 180° C. A mold temperature of 100° C. or higher causes the epoxy resin to melt during molding, so that molding tends to be easily performed. Meanwhile, a mold temperature of 200° C. or lower tends to improve the thermal conductivity of the resulting molded article.

The molded article according to the disclosure shows a diffraction peak in a diffraction angle (2θ) range of from 3.0° to 3.5° in X-ray diffractometry using CuKα radiation. In the molded article showing such a diffraction peak, a smectic structure having a particularly high order among higher-order structures is formed; therefore, the molded article has excellent thermal conductivity.

After molding the epoxy resin composition of the disclosure, the resulting molded article in the state of being removed from the mold can be directly used as is, or the molded article may be heated and thereby post-cured in an oven or the like as required and then used as a cured molded article. In the latter case, the heating conditions can be selected as appropriate in accordance with the types, amounts and the like of the respective components (e.g., epoxy resin and curing agent) contained in the epoxy resin composition. For example, the heating temperature of the molded article is preferably from 150° C. to 250° C., more preferably from 180° C. to 220° C. The heating time of the molded article is preferably from 30 minutes to 600 minutes, more preferably from 60 minutes to 300 minutes.

Similarly to the molded article prior to the post-curing, the cured molded article shows a diffraction peak in a diffraction angle (2θ) range of from 3.0° to 3.5° in X-ray diffractometry using CuKα radiation. This indicates that the high-order smectic structure formed in the molded article is maintained even after the post-curing performed by heating, as a result of which a cured molded article having excellent thermal conductivity can be obtained.

The epoxy resin composition of the disclosure can be used in the fields of not only industrial and automobile motors and industrial and automobile inverters, but also printed wiring boards, semiconductor element sealants and the like.

EXAMPLES

The invention is described below more concretely by way of examples thereof; however, the present invention is not restricted to the following examples. It is noted here that, unless otherwise specified, "part(s)" and "%" are based on mass.

The materials used for the preparation of epoxy resin compositions and abbreviations of the materials are shown below.

Epoxy Resin

An epoxy resin monomer represented by the structure shown below: 4-{4-(2,3-epoxypropoxy)phenyl}cyclohexyl=4-(2,3-epoxypropoxy)benzoate (epoxy equivalent: 212 g/eq, production method: described in Patent Document 3) was partially allowed to react with a prescribed amount of hydroquinone (manufactured by Wako Pure Chemical Industries, Ltd., hydroxyl equivalent: 55 g/eq), and the resulting prepolymerized compound was used as an epoxy resin.

The equivalent ratio (Ep/Ph) of the epoxy groups derived from the epoxy resin monomer and the phenolic hydroxyl groups derived from hydroquinone was as follows.

Epoxy resin 1: 100/7
Epoxy resin 2: 100/10
Epoxy resin 3: 100/13
Epoxy resin 4: 100/15
Epoxy resin 5: 100/20

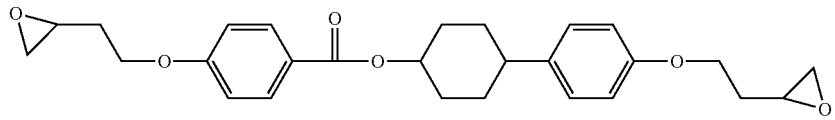

<Synthesis of Epoxy Resin 1 to Epoxy Resin 5 (Prepolymerization)>

In a 500-mL three-necked flask, 50 g (0.118 mol) of the epoxy resin monomer was weighed, and 80 g of propylene glycol monomethyl ether was added thereto. A condenser and a nitrogen-introducing tube were attached to the three-necked flask, and a stirring blade was installed in such a manner to be submerged in a solvent. This three-necked flask was immersed in a 120° C. oil bath, and stirring was initiated. After confirming that the epoxy resin monomer had been dissolved and a transparent solution was formed, hydroquinone was added thereto such that the Ep/Ph value would be 100/7, 100/10, 100/13, 100/15 or 100/20, and 0.5 g of triphenyl phosphine was further added, after which the resultant was continuously heated in the 120° C. oil bath. After 5 hours of continuous heating, propylene glycol monomethyl ether was removed from the reaction solution by distillation under reduced pressure, and the residue was cooled to room temperature (25° C.), whereby the epoxy resin 1 to the epoxy resin 5 in which the epoxy resin monomer was partially prepolymerized were each obtained.

It was confirmed that the epoxy resin 1 to the epoxy resin 5 contained compounds having the following structures (corresponding to dimeric compounds) by referring to the molecular weight of the target compound determined by liquid chromatography using a liquid chromatography apparatus equipped with a UV spectrometer and a mass spectrometer.

Specifically, the liquid chromatography was performed using LACHROM II C18 manufactured by Hitachi, Ltd. as an analytical column and tetrahydrofuran as an eluent at a flow rate of 1.0 ml/min. The UV spectrometer was used for detecting the absorbance at a wavelength of 280 nm and, as a result, it was found that the compounds having the below-described structures showed a peak at 17.4 min and the epoxy resin monomer showed a peak at 14.9 min. The mass spectrometer performed detection at an ionization voltage of 2,700 V, and it was found that the compounds having the following structures had a molecular weight of 959 in a state where a single proton was added thereto.

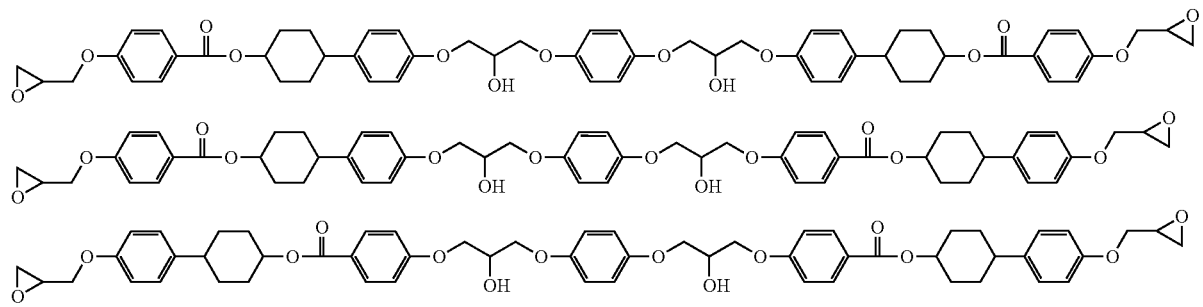

The solid content of each of the epoxy resin 1 to the epoxy resin 5 was determined by a heat-loss method. Specifically, 1.0 g to 1.1 g of a sample was weighed on an aluminum cup and left to stand for 30 minutes in a desiccator set at a temperature of 180° C., and the solid content was calculated using the following equation based on the weight measured after the 30-minute period and the weight measured before the heating.

Solid content (%)=(Weight measured after 30-minute period/Weight measured before heating)×100

The epoxy equivalent of each of the epoxy resin 1 to the epoxy resin 5 was determined by perchloric acid titration.

The content ratio of the dimeric compounds having the above-described structures and that of unreacted epoxy resin monomer with respect to the epoxy resin as a whole contained in the respective epoxy resins 1 to 5 were determined by reversed phase liquid chromatography (RPLC). As an analytical RPLC column, MIGHTYSIL RP-18 manufactured by Kanto Chemical Co., Inc. was used. The measurement was performed by a gradient method where the eluent mixing ratio (based on volume) was continuously changed from acetonitrile/tetrahydrofuran/water=20/5/75 to acetonitrile/tetrahydrofuran=80/20 (20 minutes from the start) and then to acetonitrile/tetrahydrofuran=50/50 (35 minutes from the start). The flow rate was set at 1.0 ml/min. The absorbance at a wavelength of 280 nm was detected, the area ratios of relevant peaks were determined taking the total area of all of the detected peaks as 100, and the thus obtained values were adopted as the content ratios [% by mass] of the respective compounds in the epoxy resin as a whole.

Table 1 shows the content ratio of the dimers and that of unreacted epoxy resin monomer in the respective epoxy resins 1 to 5.

TABLE 1

| Sample name | Ep/Ph | Solid content [%] | Epoxy equivalent | Dimer content ratio [%] | Content ratio of unreacted epoxy resin monomer [%] |
|---|---|---|---|---|---|
| Epoxy resin 1 | 100/7 | 99.5 | 245 | 14 | 81 |
| Epoxy resin 2 | 100/10 | 99.7 | 254 | 19 | 75 |
| Epoxy resin 3 | 100/13 | 99.6 | 275 | 23 | 69 |
| Epoxy resin 4 | 100/15 | 99.3 | 277 | 24 | 63 |
| Epoxy resin 5 | 100/20 | 99.5 | 302 | 29 | 56 |

Curing agent: catechol-resorcinol-novolac resin (added ratio based on mass: catechol/resorcinol=5/95, hydroxyl equivalent: 65 g/eq)

<Synthesis of Curing Agent>

To a 3-L separable flask equipped with a stirrer, a condenser and a thermometer, 627 g of resorcinol, 33 g of catechol, 316.2 g of 37% formaldehyde, 15 g of oxalic acid and 300 g of water were added, and the flask was heated in an oil bath to 100° C. The added materials were allowed to continuously react for 4 hours under reflux at a temperature of about 104° C. Then, the temperature inside the flask was raised to 170° C. while removing water by distillation, and the reaction was allowed to further proceed for 8 hours with the temperature being maintained at 170° C. Thereafter, the resultant was concentrated for 20 minutes under reduced pressure to remove water and the like from the system, whereby a novolac resin was obtained as the desired curing agent.

When the structure of the thus obtained curing agent was checked by FD-MS (field desorption mass spectrometry), the presence of all of the structures represented by Formula (III-1) to Formula (III-4) was confirmed.

The physical property values of the curing agent were measured as follows.

The number-average molecular weight (Mn) and the weight-average molecular weight (Mw) were measured using a high-performance liquid chromatography system L6000 manufactured by Hitachi, Ltd. and a data analyzer C-R4A manufactured by Shimadzu Corporation. As GPC columns, G2000HXL and G3000HXL manufactured by Tosoh Corporation were used, and measurement was performed at a sample concentration of 0.2% using tetrahydrofuran as a mobile phase at a flow rate of 1.0 ml/min. A calibration curve was prepared using a polystyrene standard sample, and the Mn and the Mw were determined in terms of polystyrene using the calibration curve.

The hydroxyl equivalent was measured by an acetyl chloride-potassium hydroxide titration method. Since the solution had a dark color, the titration end-point was determined not by a coloration method based on an indicator, but by potentiometric titration. Specifically, the hydroxyl equivalent was determined by acetylating the hydroxyl groups of the phenol resin with acetyl chloride in a pyridine solution, decomposing excess reagent with water, and then titrating the thus generated acetic acid with a potassium hydroxide/methanol solution.

The physical property values of the curing agent are shown below.

The curing agent was a mixture containing a compound having a structure represented by at least one of Formula (III-1) to Formula (III-4), namely a novolac resin composition containing a novolac resin (hydroxyl equivalent: 65 g/eq, Mn: 422, Mw: 564) including 35% of a monomer component (resorcinol) as a low-molecular-weight diluent, wherein $Ar^{31}$ to $Ar^{34}$ are each a group derived from 1,2-dihydroxybenzene (catechol) or 1,3-dihydroxybenzene (resorcinol) that is represented by Formula (III-a) wherein $R^{31}$=OH and $R^{32}$=$R^{33}$=H.

Curing catalyst: triphenyl phosphine (manufactured by Hokko Chemical Industry Co., Ltd.)
Alumina fillers
AL35-63 (alumina manufactured by Micron Company, average particle size: 50 μm, specific surface area: 0.1 $m^2$/g)
AL35-45 (alumina manufactured by Micron Company, average particle size: 20 μm, specific surface area: 0.2 $m^2$/g)
AX3-32 (alumina manufactured by Micron Company, average particle size: 4 μm, specific surface area: 1.0 $m^2$/g)
Silane coupling agent: KBM-573 (3-phenylaminopropyltrimethoxysilane, manufactured by Shin-Etsu Chemical Co., Ltd.)
Release agent: LICOWAX E (montanic acid ester, manufactured by Clariant Japan)
Method of Producing Molded Articles and Cured Molded Articles Prescribed amounts of each epoxy resin, the curing agent, the curing catalyst, the inorganic fillers, the silane coupling agent and the release agent were mixed and kneaded, and the resulting kneaded product was molded using a transfer molding machine at a pressure of 20 MPa and a temperature of 140° C., whereby a molded article having a size of 10 mm (width)×80 mm (length)×3 mm (thickness) was obtained. This molded article was subsequently post-cured at 180° C. for 5 hours to obtain a cured molded article.

Evaluation Methods:
<Measurement of Amount of Silane Coupling Agent-Derived Silicon Atoms Adhered per Specific Surface Area of Inorganic Fillers>

The specific surface area of each inorganic filler was measured by a BET method using a specific surface area/pore distribution analyzer (e.g., SA3100 manufactured by Beckman Coulter, Inc.). Then, the silane coupling agent-derived silicon atoms existing on the surface of each inorganic filler were quantified by $^{29}$Si CP/MAS solid-state NMR using a nuclear magnetic resonance spectrometer (NMR, JNM-ECA700 manufactured by JEOL Ltd.). From the thus obtained values, the amount of silane coupling agent-derived silicon atoms adhered per specific surface area of the inorganic fillers [mol/$m^2$] was calculated.

<Measurement of Flow Distance of Kneaded Products>
Each kneaded product was molded under the above-described conditions using a mold for spiral flow measurement according to EMMI-1-66, and the flow distance [cm] of the resultant was determined.

<Measurement of Thermal Conductivity of Molded Articles or Cured Molded Articles>
Each molded article or cured molded article was cut out into a 10-mm square piece and subsequently blackened using a graphite spray, followed by measurement of the thermal diffusivity [$m^2$/s] by a xenon flash method (using LFA447 NANOFLASH manufactured by NETZSCH). The thermal conductivity [W/(m·K)] was determined by multiplying the thus measured thermal diffusivity by the density [g/$cm^3$] and the specific heat [J/(g·K)].

The density was measured by an Archimedes method, and a value measured by DSC (using PYRIS1 manufactured by PerkinElmer Co., Ltd.) was adopted as the specific heat.

<Measurement of Glass Transition Temperature (Tg) of Molded Articles or Cured Molded Articles>
Each molded article or cured molded article was cut into a size of 5 mm (width)×50 mm (length), and the dynamic viscoelasticity was measured using a dynamic viscoelasticity analyzer (RGA-G2, manufactured by TA Instruments Inc.) along with a three-point bending vibration test fixture, at a frequency of 1 Hz and a heating rate of 5° C./minute in a temperature range of from 40° C. to 300° C. The peak top temperature at the tan δ determined from the ratio between the thus measured storage elastic modulus and loss elastic modulus was adopted as Tg [° C.].

<Judgment of Presence or Absence of Formation of Resin Smectic Structure>
X-ray diffraction (XRD, using a wide-angle X-ray diffraction apparatus ATX-G manufactured by Rigaku Corporation) was performed on each molded article or cured molded article. As an X-ray source, CuKα radiation was used, and the tube voltage, the tube current and the scanning rate were set at 50 kV, 300 mA and 1°/min, respectively. It was judged that the resin formed a smectic structure when a diffraction peak appeared in a diffraction angle (2θ) range of from 3° to 3.5°.

Table 2 below shows the formulations of the respective kneaded products and the evaluation results. It is noted here that, in Table 2, the expression "8.9E-06" used in the row of "Amount of adhered silane coupling agent-derived silicon atoms" means 8.9×$10^{-6}$.

TABLE 2

| | Item | | Unit | Example 1 | Example 2 | Example 3 | Comparative Example 1 | Comparative Example 2 |
|---|---|---|---|---|---|---|---|---|
| Formulation of kneaded product | Type | Epoxy resin 1 | % by mass | — | — | — | 5.30 | — |
| | | Epoxy resin 2 | % by mass | 5.34 | — | — | — | — |
| | | Epoxy resin 3 | % by mass | — | 5.43 | — | — | — |
| | | Epoxy resin 4 | % by mass | — | — | 5.43 | — | — |
| | | Epoxy resin 5 | % by mass | — | — | — | — | 5.52 |
| | | Curing agent | % by mass | 1.37 | 1.28 | 1.28 | 1.41 | 1.19 |
| | | Curing catalyst | % by mass | 0.03 | 0.03 | 0.03 | 0.03 | 0.03 |
| | | Alumina filler AL35-63 | % by mass | 58.67 | 58.67 | 58.67 | 58.67 | 58.67 |
| | | Alumina filler AL35-45 | % by mass | 16.76 | 16.76 | 16.76 | 16.76 | 16.76 |

TABLE 2-continued

|  | Item | Unit | Example 1 | Example 2 | Example 3 | Comparative Example 1 | Comparative Example 2 |
|---|---|---|---|---|---|---|---|
|  | Alumina filler AX3-32 | % by mass | 16.76 | 16.76 | 16.76 | 16.76 | 16.76 |
|  | Silane coupling agent | % by mass | 0.07 | 0.07 | 0.07 | 0.07 | 0.07 |
|  | Release agent | % by mass | 1.00 | 1.00 | 1.00 | 1.00 | 1.00 |
|  | Filling ratio of added alumina fillers | % by volume | 78 | 78 | 78 | 78 | 78 |
|  | Amount of adhered silane coupling agent-derived silicon atoms | mol/m$^2$ | 8.9E–06 | 8.9E–06 | 8.9E–06 | 8.9E–06 | 8.9E–06 |
| Production conditions | Molding pressure | MPa | 20 | 20 | 20 | 20 | 20 |
|  | Molding temperature | °C. | 140 | 140 | 140 | 140 | 140 |
|  | Presence or absence of post-curing | — | present | present | present | present | present |
| Property of kneaded product | Flow distance | cm | 75 | 78 | 81 | 62 | 88 |
| Properties of molded article or cured molded article | Thermal conductivity | W/(m·K) | 11.4 | 11.7 | 11.6 | 9.9 | 10.5 |
|  | Density | g/cm$^3$ | 3.25 | 3.26 | 3.27 | 3.15 | 3.27 |
|  | Tg | °C. | 180 | 185 | 185 | 180 | 160 |
|  | Presence or absence of formation of resin smectic structure | — | present | present | present | present | present |

From the results shown in Table 2, it was found that a large flow distance and excellent moldability were attained in Examples 1 to 3 where the ratio of the specific dimeric compounds of the invention was from 15% by mass to 28% by mass with respect to the epoxy resin as a whole. In addition, favorable results were also obtained for the thermal conductivity and the glass transition temperature (Tg).

In Comparative Example 1 where the ratio of the specific dimeric compounds of the invention was lower than 15% by mass with respect to the epoxy resin as a whole, it was found that the flow distance was small and the moldability was not satisfactory.

Moreover, in Comparative Example 2 where the ratio of the specific dimeric compounds of the invention was higher than 28% by mass with respect to the epoxy resin as a whole, it was found that, although a large flow distance was attained, the glass transition temperature (Tg) was not satisfactory.

The disclosure of Japanese Patent Application No. 2016-034886 filed on Feb. 25, 2016, is hereby incorporated by reference in its entirety.

All the documents, patent applications and technical standards that are described in the present specification are hereby incorporated by reference to the same extent as if each individual document, patent application or technical standard is concretely and individually described to be incorporated by reference.

The invention claimed is:

1. An epoxy resin composition, comprising:
an epoxy resin; and
a curing agent, wherein:
the epoxy resin comprises a multimeric compound having at least one selected from the group consisting of a structural unit represented by the following Formula (IA) and a structural unit represented by the following Formula (IB),
the multimeric compound comprises a dimeric compound containing two structural units represented by the following Formula (II) in one molecule,
a ratio of the dimeric compound is from 15% by mass to 28% by mass with respect to the epoxy resin as a whole, and
the epoxy resin comprises a reaction product obtained by reacting an epoxy resin monomer represented by the following Formula (I″) and a divalent phenol compound having two hydroxyl groups as substituents on a single benzene ring, with a ratio (Ep/Ph) of a number of equivalents of the epoxy groups of the epoxy resin monomer represented by the following Formula (I″) (Eh) and a number of equivalents of the phenolic hydroxyl groups of the divalent phenol compound having two hydroxyl groups as substituents on a single benzene ring (Ph) being set in a range of from 100/18 to 100/10:

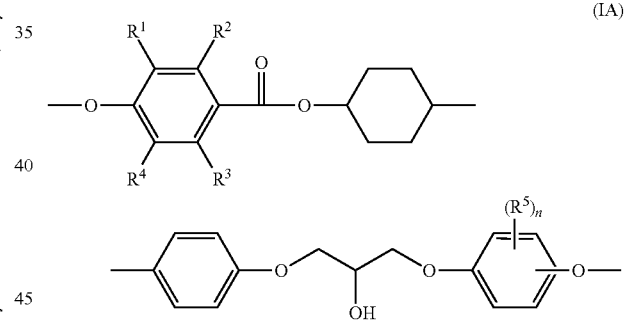

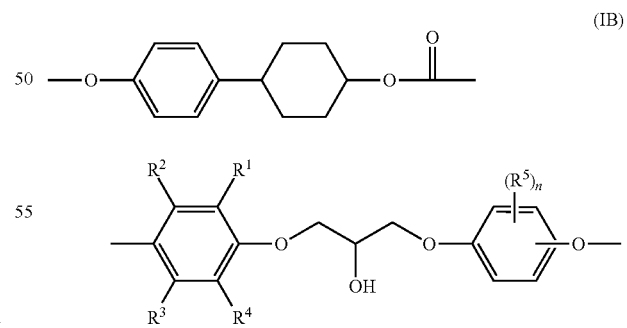

wherein, in Formula (IA) and Formula (IB), each of $R^1$ to $R^4$ independently represents a hydrogen atom or an alkyl group having from 1 to 3 carbon atoms; each $R^5$ independently represents an alkyl group having from 1 to 8 carbon atoms; and n represents an integer from 0 to 4;

(II)

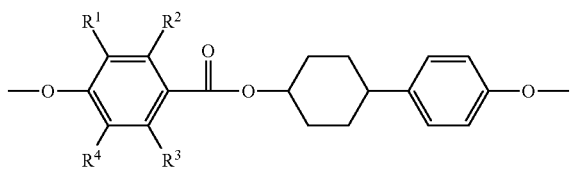

wherein, in Formula (II), each of R¹ to R⁴ independently represents a hydrogen atom or an alkyl group having from 1 to 3 carbon atoms; and (I″)

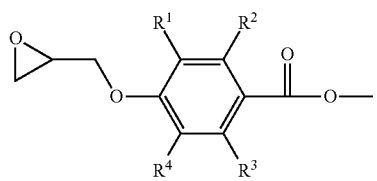

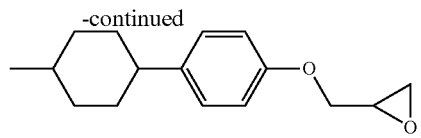

wherein, in Formula (I″), each of R¹ to R⁴ independently represents a hydrogen atom or an alkyl group having from 1 to 3 carbon atoms.

2. The epoxy resin composition according to claim 1, wherein:

the dimeric compound comprises at least one selected from the group consisting of a compound represented by the following Formula (II-A), a compound represented by the following Formula (II-B) and a compound represented by the following Formula (II-C), and a total ratio of the compound represented by the following Formula (II-A), the compound represented by the following Formula (II-B) and the compound represented by the following Formula (II-C) is from 15% by mass to 28% by mass with respect to the epoxy resin as a whole:

(II-A)

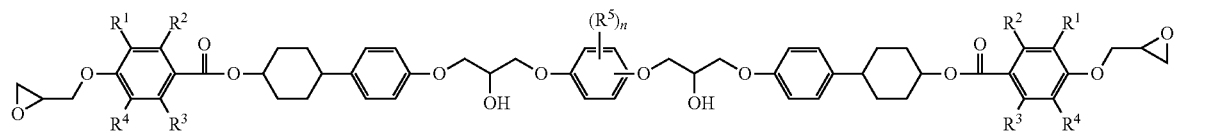

(II-B)

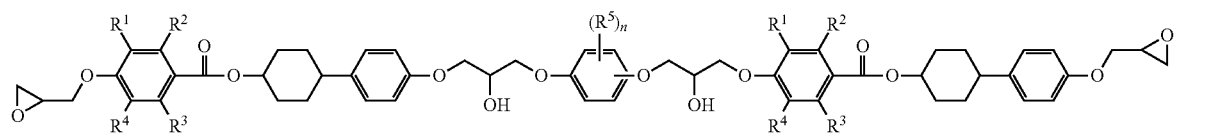

(II-C)

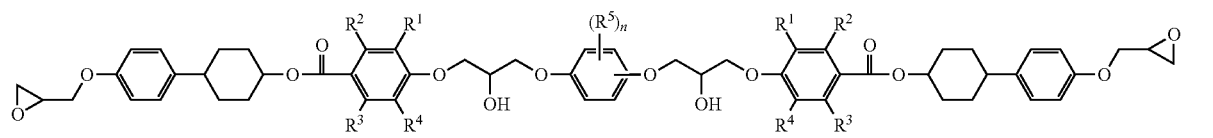

wherein, in Formula (II-A), to Formula (II-C), each of R¹ to R⁴ independently represents a hydrogen atom or an alkyl group having from 1 to 3 carbon atoms; each R⁵ independently represents an alkyl group having from 1 to 8 carbon atoms; and n represents an integer from 0 to 4.

3. The epoxy resin composition according to claim 1, wherein the structural unit represented by Formula (IA) is a structural unit represented by the following Formula (IA'), and the structural unit represented by Formula (IB) is a structural unit represented by the following Formula (IB'):

(IA')

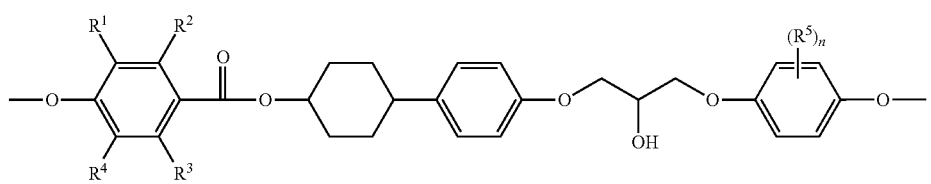

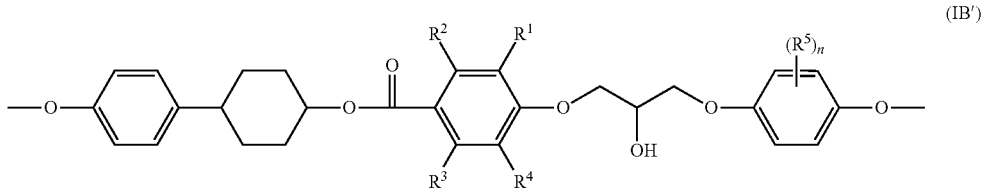

wherein, in Formula (IA') and Formula (IB'), each of $R^1$ to $R^4$ independently represents a hydrogen atom or an alkyl group having from 1 to 3 carbon atoms; each $R^5$ independently represents an alkyl group having from 1 to 8 carbon atoms; and n represents an integer from 0 to 4.

4. The epoxy resin composition according to claim 3, wherein:
the dimeric compound comprises at least one selected from the group consisting of a compound represented by the following Formula (II-A'), a compound represented by the following Formula (II-B') and a compound represented by the following Formula (II-C'), and
a total ratio of the compound represented by the following Formula (II-A'), the compound represented by the following Formula (II-B') and the compound represented by the following Formula (II-C') is from 15% by mass to 28% by mass with respect to the epoxy resin as a whole:

6. The epoxy resin composition according to claim 1, wherein the curing agent comprises a novolac resin that contains a compound having a structural unit represented by at least one selected from the group consisting of the following Formula (II-1) and Formula (II-2):

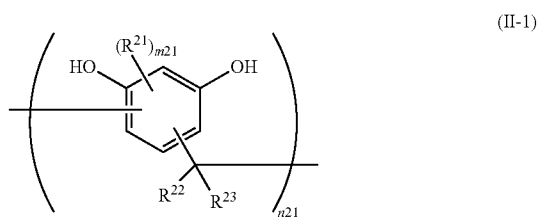

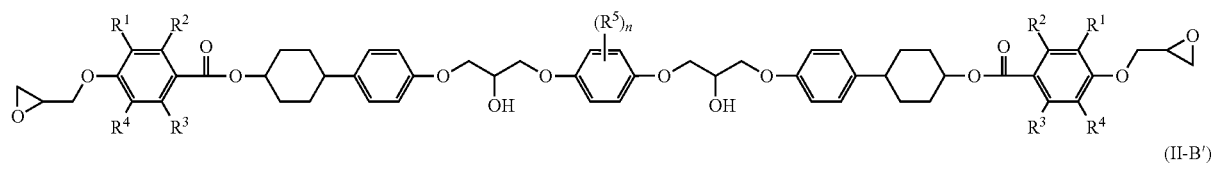

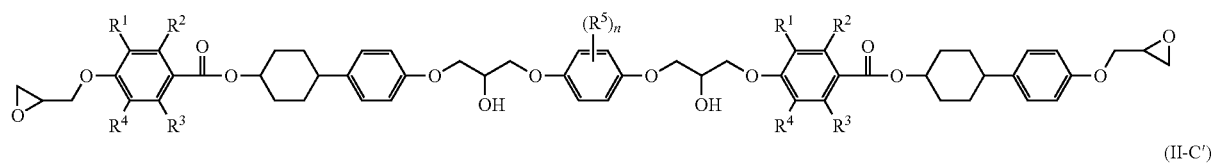

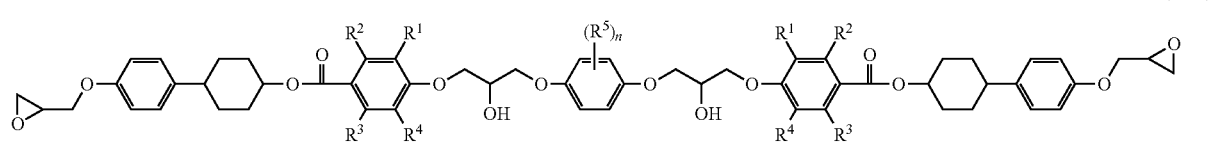

wherein, in Formula (II-A') to Formula (II-C), each of $R^1$ to $R^4$ independently represents a hydrogen atom or an alkyl group having from 1 to 3 carbon atoms; each $R^5$ independently represents an alkyl group having from 1 to 8 carton atoms; and n represents an integer from 0 to 4.

5. The epoxy resin composition according to claim 1, wherein:
the epoxy resin comprises the epoxy resin monomer represented by the Formula (I"), and
a ratio of the epoxy resin monomer is from 57% by mass to 80% by mass with respect to the epoxy resin as a whole.

-continued

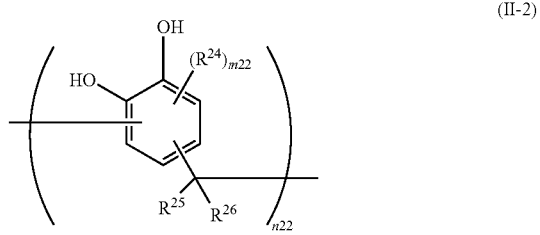

wherein, in Formula (II-1) and Formula (II-2), each of $R^{21}$ and $R^{24}$ independently represents an alkyl group, an aryl group, or an aralkyl group; each of $R^{22}$, $R^{23}$, $R^{25}$ and $R^{26}$ independently represents a hydrogen atom, an alkyl group, an aryl group, or an aralkyl group; each of m21 and m22 independently represents an integer from 0 to 2; and each of n21 and n22 independently represents an integer from 1 to 7.

7. The epoxy resin composition according to claim 6, wherein, in the curing agent, a content ratio of a monomer, which is the same as a phenol compound constituting the novolac resin, is from 10% by mass to 50% by mass.

8. The epoxy resin composition according to claim 1, wherein the curing agent comprises a novolac resin that contains a compound having a structure represented by at least one selected from the group consisting of the following Formula (III-1) to Formula (III-4):

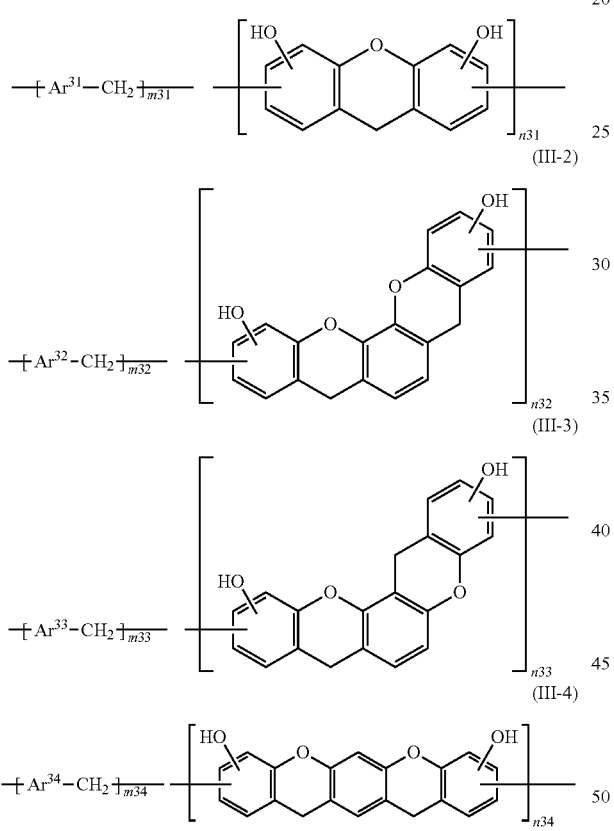

wherein, in Formula (III-1) to Formula (III-4), each of m31 to m34 and n31 to n34 independently represents a positive integer; and each of $Ar^{31}$ to $Ar^{34}$ independently represents a group represented by the following Formula (III-a) or a group represented by the following Formula (III-b):

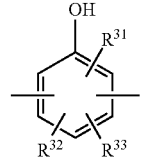

(III-a)

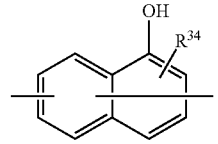

(III-b)

wherein, in Formula (III-a) and Formula (III-b), each of $R^{31}$ and $R^{34}$ independently represents a hydrogen atom or a hydroxyl group; and each of $R^{32}$ and $R^{33}$ independently represents a hydrogen atom or an alkyl group having from 1 to 8 carbon atoms.

9. The epoxy resin composition according to claim 8, wherein, in the curing agent, a content ratio of a monomer, which is the same as a phenol compound constituting the novolac resin, is from 10% by mass to 50% by mass.

10. The epoxy resin composition according to claim 1, further comprising an inorganic filler.

11. The epoxy resin composition according to claim 10, wherein the inorganic filler comprises at least one selected from the group consisting of alumina, boron nitride, aluminum nitride, silica, and magnesium oxide.

12. The epoxy resin composition according to claim 10, wherein a content ratio of the inorganic filler is from 60% by volume to 90% by volume with respect to solid content.

13. The epoxy resin composition according to claim 1, further comprising a silane coupling agent.

14. The epoxy resin composition according to claim 13, wherein the silane coupling agent comprises a phenyl group-containing silane coupling agent.

15. A semi-cured epoxy resin composition, which is a semi-cured product of the epoxy resin composition according to claim 1.

16. A cured epoxy resin composition, which is a cured product of the epoxy resin composition according to claim 1.

17. A molded article produced by press-molding the epoxy resin composition according to claim 1.

18. A cured molded article produced by post-curing the molded article according to claim 17 by heating.

* * * * *